US006277514B1

(12) United States Patent
Ying et al.

(10) Patent No.: US 6,277,514 B1
(45) Date of Patent: *Aug. 21, 2001

(54) PROTECTIVE COATING FOR SEPARATORS FOR ELECTROCHEMICAL CELLS

(75) Inventors: Qicong Ying, Tucson, AZ (US); Steven A. Carlson, Cambridge, MA (US); Terje A. Skotheim, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,901

(22) Filed: Nov. 23, 1999

Related U.S. Application Data

(63) Continuation-in-part of application No. 09/399,967, filed on Sep. 21, 1999, now Pat. No. 6,183,901, which is a continuation-in-part of application No. 09/215,029, filed on Dec. 17, 1998, now Pat. No. 6,194,098.

(51) Int. Cl.[7] .................................................. H01M 2/14
(52) U.S. Cl. .................. 429/129; 429/144; 429/247; 429/249; 429/250; 429/251; 429/218.1; 429/231.1; 429/231.4; 429/300; 429/304
(58) Field of Search .................... 429/129, 144, 429/247, 249, 250, 251, 218.1, 231.1, 231.4, 300, 304

(56) References Cited

U.S. PATENT DOCUMENTS

| | | |
|---|---|---|
| 3,143,418 | 8/1964 | Priest et al. . |
| 3,779,768 | 12/1973 | Cope et al. . |
| 4,064,116 | 12/1977 | Papetti . |
| 4,143,214 | 3/1979 | Chang et al. .......................... 429/112 |
| 4,152,491 | 5/1979 | Chang et al. .......................... 429/112 |
| 4,302,524 | 11/1981 | Mandella et al. .................... 430/155 |
| 4,451,550 | 5/1984 | Bennett et al. ....................... 430/176 |
| 4,664,991 | 5/1987 | Perichaud et al. ................... 429/194 |
| 4,739,018 | 4/1988 | Armand et al. .................... 525/326.2 |
| 4,833,048 | 5/1989 | De Jonghe et al. ................. 429/104 |
| 4,894,301 | 1/1990 | Dyer ...................................... 429/193 |
| 4,917,974 | 4/1990 | De Jonghe et al. ................. 429/104 |
| 5,162,175 | 11/1992 | Visco et al. .......................... 429/192 |
| 5,194,341 | 3/1993 | Bagley et al. ....................... 429/189 |
| 5,314,765 | 5/1994 | Bates .................................... 429/194 |
| 5,324,599 | 6/1994 | Oyama et al. ....................... 429/192 |
| 5,326,391 | 7/1994 | Anderson et al. ................... 106/409 |
| 5,362,493 | 11/1994 | Skotheim et al. ................... 429/194 |
| 5,418,091 | 5/1995 | Gozdz et al. ........................ 429/252 |
| 5,441,831 | 8/1995 | Okamoto et al. ................... 429/213 |
| 5,463,178 | 10/1995 | Suzuki et al. ....................... 428/216 |
| 5,468,574 | 11/1995 | Ehrenberg et al. ................. 429/194 |
| 5,516,598 | 5/1996 | Visco et al. ............................ 429/42 |
| 5,529,860 | 6/1996 | Skotheim et al. ................... 429/213 |
| 5,538,812 | 7/1996 | Lee et al. ............................. 429/192 |
| 5,549,989 | 8/1996 | Anani .................................. 429/193 |
| 5,585,039 | 12/1996 | Matsumoto et al. ................ 429/192 |
| 5,597,659 | 1/1997 | Morigaki et al. ................... 429/190 |
| 5,601,947 | 2/1997 | Skotheim et al. ................... 429/213 |
| 5,609,795 | 3/1997 | Matsumoto et al. ................ 429/192 |

(List continued on next page.)

FOREIGN PATENT DOCUMENTS

| | | |
|---|---|---|
| 0 524 626 A1 | 1/1993 | (EP) . |
| 0 600 718 A2 | 6/1994 | (EP) . |
| 0 814 520 A2 | 12/1997 | (EP) . |
| 0 836 238 A1 | 4/1998 | (EP) . |
| 0 875 950 A2 | 11/1998 | (EP) . |
| WO 99/33125 | 7/1999 | (WO) . |

*Primary Examiner*—Laura Weiner
(74) *Attorney, Agent, or Firm*—Morrison & Foerster LLP

(57) ABSTRACT

This invention pertains to separators for use in electrochemical cells which comprise at least one microporous pseudo-boehmite layer, which separator is in contact with at least one protective coating layer positioned on the anode-facing side of the separator opposite from the cathode active layer in the cell; electrolyte elements comprising such separators; electrical current producing cells comprising such separators; and methods of making such separators, electrolyte elements and cells.

24 Claims, 6 Drawing Sheets

U.S. PATENT DOCUMENTS

| | | | |
|---|---|---|---|
| 5,648,187 | 7/1997 | Skotheim et al. | 429/213 |
| 5,679,482 | 10/1997 | Ehrenberg et al. | 429/249 |
| 5,690,702 | 11/1997 | Skotheim et al. | 29/623.1 |
| 5,691,005 | 11/1997 | Morigaki et al. | 427/508 |
| 5,824,434 | 10/1998 | Kawakami et al. | 429/209 |
| 5,882,721 | 3/1999 | Delnick | 429/194 |

PROTECTIVE COATING FOR SEPARATORS FOR ELECTROCHEMICAL CELLS

This application is a continuation-in-part of U.S. patent application Ser. No. 09/399,967, filed Sep. 21, 1999, now U.S. Pat. No. 6,183,901 which is a continuation-in-part of U.S. patent application Ser. No. 09/215,029, filed Dec. 17, 1998, U.S. Pat. No. 6,194,098 the contents of which are incorporated herein by reference in their entirety.

TECHNICAL FIELD

The present invention relates generally to the field of separators for electrochemical cells. More particularly, this invention pertains to separators for electrochemical cells which comprise at least one microporous pseudo-boehmite layer and at least one protective coating layer; electrolyte elements comprising such separators; electric current producing cells comprising such separators; and methods of making such separators, electrolyte elements, and cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

In an electric current producing cell or battery, discharge of the cell from its charged state occurs by allowing electrons to flow from the anode to the cathode through an external circuit resulting in the electrochemical reduction of the cathode active material at the cathode and the electrochemical oxidation of the anode active material at the anode. Under undesirable conditions, electrons may flow internally from the anode to the cathode, as would occur in a short circuit. To prevent this undesirable internal flow of electrons that occurs in a short circuit, an electrolyte element is interposed between the cathode and the anode. This electrolyte element must be electronically non-conductive to prevent the short circuiting, but must permit the transport of positive ions between the anode and the cathode during cell discharge, and in the case of a rechargeable cell, during recharge. The electrolyte element should also be stable electrochemically and chemically towards both the anode and the cathode.

Typically, the electrolyte element contains a porous material, referred to as a separator since it separates or insulates the anode and the cathode from each other, and an aqueous or non-aqueous electrolyte in the pores of the separator. The aqueous or non-aqueous electrolyte typically comprises ionic electrolyte salts and electrolyte solvents, and optionally, other materials such as for example, polymers. A variety of materials have been used for the porous layer or separator of the electrolyte element in electric current producing cells. These porous separator materials include polyolefins such as polyethylenes and polypropylenes, glass fiber filter papers, and ceramic materials. Usually these separator materials are supplied as porous free standing films which are interleaved with the anodes and the cathodes in the fabrication of electric current producing cells. Alternatively, the porous separator layer can be applied directly to one of the electrodes, for example, as described in U.S. Pat. No. 5,194,341 to Bagley et al.

Porous separator materials have been fabricated by a variety of processes including, for example, stretching combined with special heating and cooling of plastic films, extraction of a soluble plasticizer or filler from plastic films, and plasma oxidation. The methods for making conventional free standing separators typically involve extrusion of melted polymeric materials either followed by a post-heating and stretching or drawing process or followed by a solvent extraction process to provide the porosity throughout the separator layer. U.S. Pat. No. 5,326,391 to Anderson et al. and references therein, describe the fabrication of free standing porous materials based on extraction of a soluble plasticizer from pigmented plastic films. U.S. Pat. No. 5,418,091 to Gozdz et al. and references therein, describe forming electrolyte layers by extracting a soluble plasticizer from a fluorinated polymer matrix either as a coated component of a multilayer battery structure or as an individual separator film. U.S. Pat. No. 5,194,341 to Bagley et al. describes an electrolyte element with a microporous silica layer and an organic electrolyte. The silica layer was the product of the plasma oxidation of a siloxane polymer.

These manufacturing methods for free standing separators are complex and expensive and are not effective either in providing ultrafine pores of less than 1 micron in diameter or in providing separator thicknesses of less than 15 microns. The methods for making a separator coated directly on another layer of the cell typically involve a solvent extraction process after coating to provide the porosity throughout the separator layer. As with the free standing separators, this solvent extraction process is complex, expensive, and not effective in providing ultrafine pores of less than 1 micron in diameter.

Carlson et al. in U.S. patent application Ser. No. 08/995,089 to the common assignee, describe separators for use in electrochemical cells which comprise a microporous pseudo-boehmite layer and electrolyte elements comprising such separators. The pseudo-boehmite separators and methods of making such separators are described for both free standing separators and as a separator layer coated on an electrode.

As the non-aqueous electrolyte in the pores of the separator of an electrolyte element, a liquid organic electrolyte comprising organic solvents and ionic salts is typically used. Alternatively, a gel or solid polymer electrolyte containing polymers and ionic salts, and optionally organic solvents, might be utilized instead of the liquid organic electrolyte. For example, U.S. Pat. Nos. 5,597,659 and 5,691,005 to Morigaki et al. describe a separator matrix formed of a microporous polyolefin membrane impregnated in its pores with an ionic conductive gel electrolyte.

In addition to being porous and being chemically stable to the other materials of the electric current producing cell, the separator should be flexible, thin, economical in cost, and have good mechanical strength. These properties are particularly important when the cell is spirally wound or is folded to increase the surface area of the electrodes and thereby improve the capacity and high rate capability of the cell. Typically, free standing separators have been 25 microns ($\mu$m) or greater in thickness. As batteries have continued to evolve to higher volumetric capacities and smaller lightweight structures, there is a need for separators that are 15 microns or less in thickness with a substantial increase in the area of the separator in each battery. Reducing the thickness from 25 microns to 15 microns or less greatly increases the challenge of providing porosity and good mechanical strength while not sacrificing the protection against short circuits or not significantly increasing the total cost of the separator in each battery.

This protection against short circuits is particularly critical in the case of secondary or rechargeable batteries with lithium as the anode active material. During the charging process of the battery, dendrites can form on the surface of the lithium anode and can grow with continued charging. A key feature of the separator in the electrolyte element of lithium rechargeable batteries is that it have a small pore structure, such as 10 microns or less in pore diameter, and sufficient mechanical strength to prevent the lithium dendrites from contacting the cathode and causing a short circuit with perhaps a large increase in the temperature of the battery leading to an unsafe explosive condition.

Another highly desirable feature of the separator in the electrolyte element is that it is readily wetted by the electrolyte which provides the ionic conductivity. When the separator material is a polyolefinic material, which has nonpolar surface properties, the electrolytes (which typically have highly polar properties) often poorly wet the separator material. This results in low capacities in the battery due to the nonuniform distribution of the electrolyte in the electrolyte element.

Further it would be highly advantageous to be able to prepare free standing separators by a relatively simple process of coating which directly provides ultrafine pores as small as 1 nm in diameter and can readily provide a range of thicknesses from 50 microns or greater down to 1 micron. Also, it would be advantageous to be able to prepare separators with ultrafine pores and a wide range of thicknesses coated directly on another layer of the electric current producing cell by a process of coating without requiring any subsequent solvent extraction or other complex process which is costly, difficult to control, and not effective in providing ultrafine pores.

A separator, particularly one with a thickness less than 25 microns, which is applicable for electric current producing cells, and which can avoid the foregoing problems often encountered with the use of polyolefinic and other conventional porous materials made using extrusion, extraction, or other processes would be of great value to the battery industry.

SUMMARY OF THE INVENTION

The present invention pertains to a separator for use in an electric current producing cell, wherein the separator comprises (i) at least one microporous pseudo-boehmite layer in contact with (ii) at least one protective coating layer. In one embodiment, the protective coating layer is adjacent to one outer surface of the microporous pseudo-boehmite layer. In one embodiment, the protective coating layer is an intermediate layer between two microporous pseudo-boehmite layers, wherein the compositions of the microporous pseudo-boehmite layers may be the same or different. In one embodiment, the protective coating layer is an intermediate layer between two microporous pseudo-boehmite layers, and the separator further comprises an additional protective coating layer on the outside surface of one or both microporous pseudo-boehmite layers, and further wherein the compositions of the two microporous pseudo-boehmite layers may be the same or different, and the compositions of the two or more protective coating layers may be the same or different. In one embodiment, the microporous pseudo-boehmite layer is an intermediate layer between two protective coating layers, wherein the compositions of the protective coating layers may be the same or different.

In one embodiment, the at least one protective coating layer comprises a polymer. In one embodiment, the protective coating layer comprising a polymer is a single ion conducting layer. In one embodiment of the invention, the protective coating layer comprising a polymer comprises one or more moieties from the polymerization of one or more monomers or macromonomers selected from the group consisting of: acrylates, methacrylates, olefins, epoxides, vinyl alcohols, vinyl ethers, and urethanes. In one embodiment, the olefinic monomer is selected from the group consisting of: ethylene, propylene, butene, pentene, hexene, octene, and styrene. In one embodiment, the acrylate monomer or macromonomer is selected from the group consisting of polyethylene glycol diacrylates, polypropylene glycol diacrylates, ethoxylated neopentyl glycol diacrylates, ethoxylated bisphenol A diacrylates, ethoxylated aliphatic urethane acrylates, ethoxylated alkylphenol acrylates, and alkylacrylates.

In another embodiment, the polymer of the protective coating layer comprises one or more moieties formed by polymerization of one or more monomers or macromonomers selected from the group consisting of monomers and macromonomers having the formula:

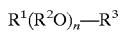

wherein:

R$^1$ is the same or different at each occurrence and is selected from the group consisting of
CH$_2$=CH(C=O)—O—,
CH$_2$=C(CH$_3$)(C=O)O—,
CH$_2$=CH—,

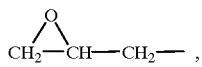

CH$_2$=CH—O—;

R$^2$ is the same or different at each occurrence and is selected from the group consisting of
—CH$_2$—CH$_2$—,
—CH(CH$_3$)—CH$_2$—,
—CH$_2$—CH$_2$—CH$_2$—,
—CH(C$_2$H$_5$)—CH$_2$—,
—CH$_2$—CH$_2$—CH$_2$—CH$_2$—;

R$^3$ is the same or different at each occurrence and is selected from the group consisting of
cyano, methyl, ethyl, propyl, isopropyl, butyl, isobutyl, hexyl, 2-ethylhexyl, decyl, dodecyl, phenyl, butylphenyl, octylphenyl, nonylphenyl, R$^1$, —X—(OR$^2$)$_m$—R$^1$, —Y[(OR$^2$)$_o$—R$^1$]$_2$, —Z[(OR$^2$)$_p$—R$^1$]$_3$;

X is a divalent radical selected from the group consisting of:

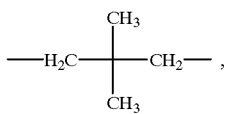

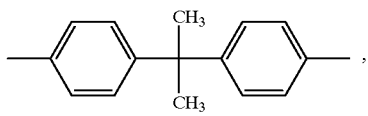

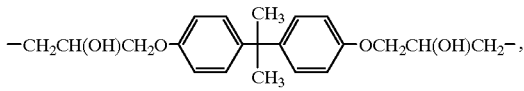

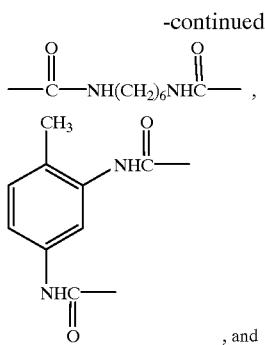
, and

—$(CH_2)_r$—, where r is 3, 4, or 6;

Y is a trivalent radical selected from the group consisting of

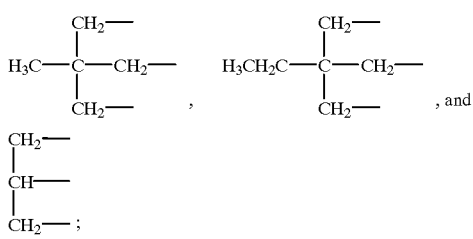
, and

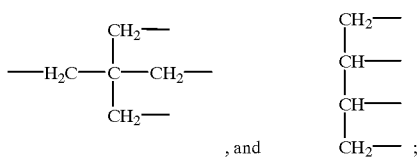
;

Z is a tetravalent radical selected from the group consisting of $$\begin{array}{c} CH_2— \\ | \\ —H_2C—C—CH_2— \\ | \\ CH_2— \end{array} \text{, and } \begin{array}{c} CH_2— \\ | \\ CH— \\ | \\ CH— \\ | \\ CH_2— \end{array};$$

m is an integer ranging from 0 to 100;
n is an integer ranging from 0 to 100;
o is an integer ranging from 0 to 100; and,
p is an integer ranging from 0 to 100.

In one embodiment, the polymer of the protective coating layer is selected from the group consisting of polyacrylates, polymethacrylates, polyolefins, polyurethanes, polyvinyl ethers, polyvinyl pyrrolidones, acrylonitrile-butadiene rubber, styrene-butadiene rubber, acrylonitrile-butadiene-styrene, sulfonated styrene/ethylene-butylene/styrene tri-block polymers, and mixtures thereof.

In a preferred embodiment, the polymer has a molecular weight of greater than 10,000. In a more preferred embodiment, the polymer has a molecular weight greater than 50,000.

Another aspect of the invention pertains to a separator for use in an electric current producing cell, wherein the cell comprises a cathode having a cathode active layer, an anode, and an electrolyte element interposed between the cathode and the anode, and the electrolyte element comprises a separator and an electrolyte; wherein the separator comprises at least one microporous pseudo-boehmite layer and wherein, on the side of the separator opposite from the cathode of the cell, is coated at least one protective coating layer. In one embodiment, the separator comprises a first and a second protective coating layer, wherein the first protective coating layer is in contact with the microporous pseudo-boehmite layer on the side of the separator opposite from the cathode active layer, and the second protective coating layer is in contact with the first protective coating layer on the side opposite from the pseudo-boehmite layer, and wherein the two protective layers may be the same or different.

In one embodiment of the invention, the protective coating layer comprises a single ion conductive layer. In one embodiment, the protective coating layer comprises a single ion conducting glass conductive to lithium ions. In one embodiment, the single ion conducting glass is selected from the group consisting of lithium silicates, lithium borates, lithium aluminates, lithium phosphates, lithium phosphorus oxynitrides, lithium titanium oxides, lithium lanthanum oxides, lithium silicosulfides, lithium borosulfides, lithium aluminosulfides, lithium germanosulfides, and lithium phosphosulfides.

In one embodiment, the protective coating layer comprises a conductive polymer selected from the group consisting of poly(p-phenylene), polyacetylene, poly (phenylenevinylene), polyazulene, poly(perinaphthalene), polyacenes, and poly(naphthalene-2,6-diyl).

In one embodiment, the protective coating layer has a thickness of from about 0.2 microns to about 20 microns. In a preferred embodiment, the protective coating layer has a thickness of from about 0.5 microns to about 15 microns. In a more preferred embodiment, the protective coating layer has a thickness of from about 0.5 microns to about 10 microns. In a most preferred embodiment, the protective coating layer has a thickness of from about 0.5 microns to about 5 microns.

In one embodiment of the invention, in which the protective coating layer comprises a single ion conducting glass or a conductive polymer, the protective coating layer has a thickness of from about 5 nm to about 5 microns.

In one embodiment of the present invention, the protective coating layer further comprises a pigment. In one embodiment, the pigment of the protective coating layer is selected from the group consisting of colloidal silicas, amorphous silicas, surface treated silicas, colloidal aluminas, amorphous aluminas, conductive carbons, graphites, tin oxides, titanium oxides and polyethylene beads.

In one embodiment, the polymer and the pigment are present in the protective coating layer at a weight ratio of from about 1:10 to about 10:1. In a preferred embodiment, the polymer and the pigment are present in the protective coating layer at a weight ratio of from about 1:4 to about 6:1. In a more preferred embodiment, the polymer and the pigment are present in the protective coating layer at a weight ratio of from about 1:3 to about 4:1.

In one embodiment, the pigment of the protective coating layer has a particle size of from about 1 nm to about 10,000 nm. In a preferred embodiment, the pigment of the protective coating layer has a particle size of from about 2 nm to about 6,000 nm. In a more preferred embodiment, the pigment of the protective coating layer has a particle size of from about 5 nm to about 3,000 nm.

In another embodiment, the pigment of the protective coating layer has a particle size and the microporous pseudo-boehmite layer has an average pore diameter which is smaller than said particle size.

In one embodiment of the present invention, the pseudo-boehmite layer has a pore volume from 0.02 to 2.0 cm$^3$/g. In a preferred embodiment, the pseudo-boehmite layer has a pore volume from 0.3 to 1.0 cm$^3$/g. In a more preferred embodiment, the pseudo-boehmite layer has a pore volume from 0.4 to 0.7 cm$^3$/g.

In one embodiment, the pseudo-boehmite layer of the separator has an average pore diameter from 1 to 300 nm. In a preferred embodiment, the pseudo-boehmite layer has an average pore diameter from 2 to 30 nm. In a more preferred embodiment, the pseudo-boehmite layer has an average pore diameter from 3 to 10 nm.

In one embodiment, the pseudo-boehmite layer of the separator has a thickness of from 1 micron to 50 microns. In a preferred embodiment, the pseudo-boehmite layer has a thickness of from 1 micron to 25 microns. In a more preferred embodiment, the pseudo-boehmite layer has a thickness of from 2 microns to 15 microns.

In another embodiment of the present invention, the pseudo-boehmite layer further comprises a binder. In one embodiment, the binder is present in an amount of 5 to 70% by weight of pseudo-boehmite in the pseudo-boehmite layer in the separator. In a preferred embodiment, the binder comprises polyvinyl alcohol, polyethylene oxide, polyvinyl pyrrolidone, copolymers of the foregoing, or a combination thereof.

In one embodiment, the separator for use in an electric current producing cell comprises at least one microporous pseudo-boehmite layer in contact with at least one protective coating layer comprising a polymer and a silica. In a preferred embodiment, the silica of the protective coating layer is a hydrophobic silica.

Another aspect of the invention pertains to an electrolyte element for use in an electric current producing cell, the electrolyte element comprising: (a) a separator; and, (b) an organic electrolyte; wherein, the separator comprises: (i) at least one microporous pseudo-boehmite layer, as described herein, in contact with (ii) at least one protective coating layer, as described herein; and the electrolyte is contained within pores of the separator. Suitable materials for use as the electrolyte include liquid electrolytes, gel polymer electrolytes, and solid polymer electrolytes. In one embodiment, the electrolyte is an organic electrolyte. In one embodiment, the electrolyte is an aqueous electrolyte. In a preferred embodiment, the organic electrolyte is a liquid electrolyte.

Still another aspect of the present invention pertains to a method of forming a separator for use in electric current producing cells, wherein the separator comprises: (i) at least one microporous pseudo-boehmite layer, as described herein, in contact with (ii) at least one protective coating layer, as described herein. In one embodiment, wherein the protective coating layer comprises a polymer, the method comprises the steps of: (a) coating onto a substrate a first liquid mixture, A, comprising a boehmite sol, or alternatively, coating onto a substrate a first liquid mixture, B, comprising one or more polymers, monomers, or macromonomers, to form a first coating layer; (b) drying the first coating layer formed in step (a) to form a microporous pseudo-boehmite layer, if the first liquid mixture A was utilized in step (a), or alternatively, drying the first coating layer formed in step (a) to form a protective coating layer, if the first liquid mixture B was utilized in step (a), to form a dried first coating layer; (c) coating onto the layer formed in step (b) a second liquid mixture, B', comprising one or more polymers, monomers, or macromonomers to form a second coating layer, if a microporous pseudo-boehmite layer was formed in step (b), or alternatively, coating onto the layer formed in step (b) a second liquid mixture, A', comprising a boehmite sol, if a protective coating layer was formed in step (b), to form a second coating layer; (d) drying the second coating layer formed in step (c) to form a protective coating layer, if the second liquid mixture B' was utilized in step (c), or alternatively, to form a microporous pseudo-boehmite layer, if the second liquid mixture A' was utilized in step (c), to form a dried second coating layer. In one embodiment, subsequent to formation of a protective coating layer, there is a further step of curing the dried coating layer to form a cured protective coating layer by use of an energy source. In one embodiment, the curing is performed using an energy source selected from the group consisting of: heat, ultraviolet light, visible light, infrared radiation, and electron beam radiation. In one embodiment, after step (d), steps (a) and (b) are repeated to form a third coating layer. In one embodiment, after step (d), steps (a), (b), (c), and (d) are repeated to form a third coating layer and a fourth coating layer.

In one embodiment, the polymers, monomers and macromonomers for use in forming the protective coating layer have a molecular weight which is too large for impregnation into pores of the microporous pseudo-boehmite layer. In one embodiment, the polymers, monomers and macromonomers have a molecular weight greater than 2000. In one embodiment, the polymers, monomers and macromonomers have a molecular weight greater than 5000.

In one embodiment of the method, the monomers and macromonomers of the first or second liquid mixture comprising polymers, monomers and macromonomers are selected from the group consisting of acrylates, methacrylates, olefins, epoxides, vinyl alcohols, vinyl ethers, and urethanes. In one embodiment, the acrylate monomer or macromonomer of the first or second liquid mixture is selected from the group consisting of polyethylene glycol diacrylates, polypropylene glycol diacrylates, ethoxylated neopentyl glycol diacrylates, ethoxylated bisphenol A diacrylates, ethoxylated aliphatic urethane acrylates, and ethoxylated alkylphenol acrylates.

In one embodiment, the monomers and macromonomers of the liquid mixture, B or B', comprising one or more polymers, monomers or macromonomers, are selected from monomers or macromonomers having the formula $R^1(R^2O)_n—R^3$, as described herein.

In one embodiment of the methods, the liquid mixture, B or B', comprising one or more polymers, monomers or macromonomers, comprises a polymer. In one embodiment, one or more polymers of liquid mixture, B or B', are selected from the group consisting of polyacrylates, polymethacrylates, polyolefins, polyurethanes, polyvinyl ethers, polyvinyl pyrrolidones, acrylonitrile-butadiene rubber, styrene-butadiene rubber, acrylonitrile-butadiene-styrene, sulfonated styrene/ethylene-butylene/styrene triblock polymers, and mixtures thereof.

In one embodiment of the method, the liquid mixture, B or B', comprising one or more polymers, monomers or macromonomers, further comprises a second polymer. In one embodiment of the method, the liquid mixture, B or B', comprising one or more polymers, monomers or macromonomers, further comprises a pigment, as described herein.

In one embodiment, the liquid mixture, B or B', comprising one or more polymers.

In one embodiment of the methods, the liquid mixture, B or B', further comprises one or more solvents selected from the group consisting of water, acetone, methyl ethyl ketone, acetonitrile, benzene, toluene, tetrahydrofuran, dioxane, chloroform, pentane, hexane, cyclohexane, methyl acetate, ethyl acetate, butyl acetate, and methylene chloride.

In one embodiment, the liquid mixture, B or B', comprising one or more polymers, monomers, or macromonomers, has a viscosity from 15 cP to 5000 cP.

In one embodiment, the liquid mixture, A or A', comprising a boehmite sol further comprises a binder, as described herein. In one embodiment, the binder is present in the amount of 5 to 70% of weight of the pseudo-boehmite in the pseudo-boehmite layer.

In one embodiment of the methods, subsequent to step (d), there is a further step of delaminating the separator from the substrate. In one embodiment of the methods, subsequent to the third coating layer, there is a further step of delaminating the separator from the substrate. In one embodiment, at least one outermost surface of the substrate comprises a cathode active layer and the first liquid mixture of step (a) is coated onto the cathode coating layer.

In another embodiment of the methods of the present invention of forming a separator for use in electric current producing cells, wherein the separator comprises: (i) at least one microporous pseudo-boehmite layer, in contact with (ii) at least one protective coating layer and where the protective coating layer is on the side of the separator opposite from the cathode active layer in the cell the protective coating layer is formed by a physical deposition process or a chemical vapor deposition process. In one embodiment, the protective coating layer comprises a single ion conducting glass conductive to lithium ions. In one embodiment, the single ion conducting glass is selected from the group consisting of lithium silicates, lithium borates, lithium aluminates, lithium phosphates, lithium phosphorus oxynitrides, lithium titanium oxides, lithium lanthanum oxides, lithium silicosulfides, lithium borosulfides, lithium aluminosulfides, lithium germanosulfides, and lithium phosphosulfides. In one embodiment, the protective coating layer comprises a conductive polymer selected from the group consisting of poly(p-phenylene), polyacetylene, poly (phenylenevinylene), polyazulene, poly(perinaphthalene), polyacenes, and poly(naphthalene-2,6-diyl).

Yet another aspect of the present invention pertains to a method of making an electrolyte element for an electric current producing cell, wherein the electrolyte element comprises a separator comprising: (i) at least one microporous pseudo-boehmite layer in contact with (ii) at least one protective coating layer; wherein the method comprises the steps of forming a separator, as described herein for methods of forming a separator, and after formation of the separator, there is a further step of contacting a surface of the separator with an electrolyte, as described herein, thereby causing infusion of the electrolyte into pores of the separator. In one embodiment, the electrolyte is an organic electrolyte. In one embodiment, the electrolyte is an aqueous electrolyte.

In a preferred embodiment of the method for making an electrolyte element, the organic electrolyte is a liquid electrolyte.

Still another aspect of the invention pertains to an electric current producing cell, said cell comprising a cathode, an anode, and an electrolyte element interposed between said cathode and said anode, wherein said electrolyte element comprises: (a) a separator; and, (b) an electrolyte; wherein, said separator comprises: (i) at least one microporous pseudo-boehmite layer, as described herein, in contact with (ii) at least one protective coating layer, as described herein; and, said electrolyte, as described herein, is present within pores of said separator.

In one embodiment of the electric current producing cell, the cell is a secondary battery. In one embodiment of the electric current producing cell, the cell is a primary battery.

In one embodiment of the electric current producing cell, the anode active material is selected from the group consisting of lithium metal, lithium-aluminum alloys, lithium-tin alloys, lithium-intercalated carbons, and lithium-intercalated graphites.

In one embodiment of the electric current producing cell, the cathode comprises a cathode active material selected from the group consisting of electroactive transition metal chalcogenides, electroactive conductive polymers, and electroactive sulfur-containing materials.

In one embodiment of the electric current producing cell, the electroactive sulfur-containing material of the cathode comprises elemental sulfur. In one embodiment, the electroactive sulfur-containing material comprises a sulfur-containing polymer comprising a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 8. In one embodiment, the sulfur-containing polymer has polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, —$S_m$,— is incorporated into the polymer backbone chain by covalent bonding of terminal sulfur atoms of the polysulfide moiety. In one embodiment, the sulfur-containing polymer comprises greater than 75 weight percent of sulfur.

A further aspect of the present invention pertains to a method for forming an electric current producing cell. The method comprises providing an anode, as described herein, and a cathode, as described herein, and interposing an electrolyte element, as described herein, between the anode and the cathode. In one embodiment of the method for forming an electric current producing cell, the electrolyte of the electrolyte element comprises one or more materials selected from the group consisting of liquid electrolytes, gel polymer electrolytes, and solid polymer electrolytes, as described herein.

As will be appreciated by one of skill in the art, features of one aspect or embodiment of the invention are also applicable to other aspects or embodiments of the invention.

Figure 5:
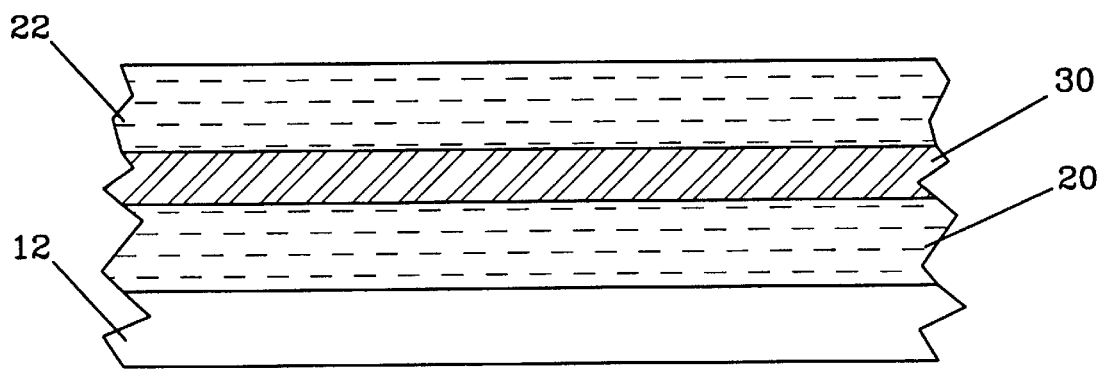

FIG. 5 shows a sectional view of one embodiment of the separator of this invention comprising (a) a first layer 20 comprising microporous pseudo-boehmite, (b) a second layer 30 of a protective coating, and (c) a third layer 22 comprising microporous pseudo-boehmite, on a smooth release substrate 12.

Figure 6:
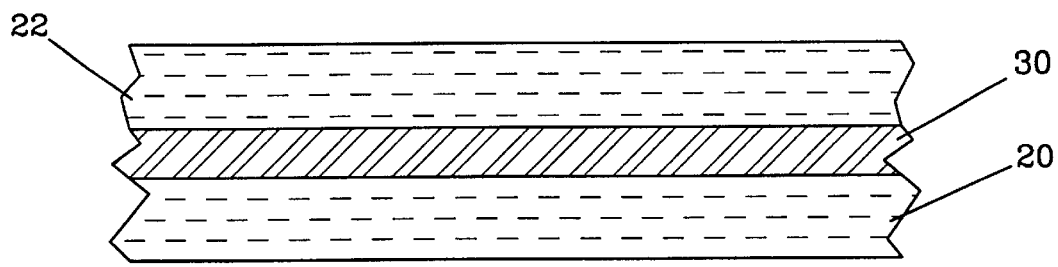

FIG. 6 shows a sectional view of one embodiment of the separator of this invention as a free standing separator comprising (a) a microporous pseudo-boehmite layer 20, (b) a protective coating layer 30, and (c) a microporous pseudo-boehmite layer 22.

Figure 7:
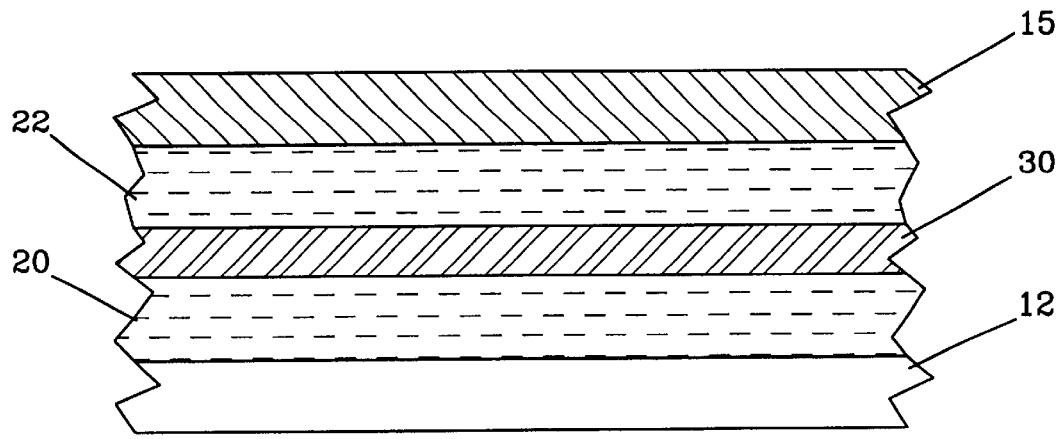

FIG. 7 shows a sectional view of one embodiment of the separator of this invention comprising (a) a first layer 20 comprising microporous pseudo-boehmite, (b) a second layer 30 of a protective coating, (c) a third layer 22 comprising microporous pseudo-boehmite, and (d) a fourth layer 15 of a cathode active layer, on a smooth release substrate 12.

Figure 8:
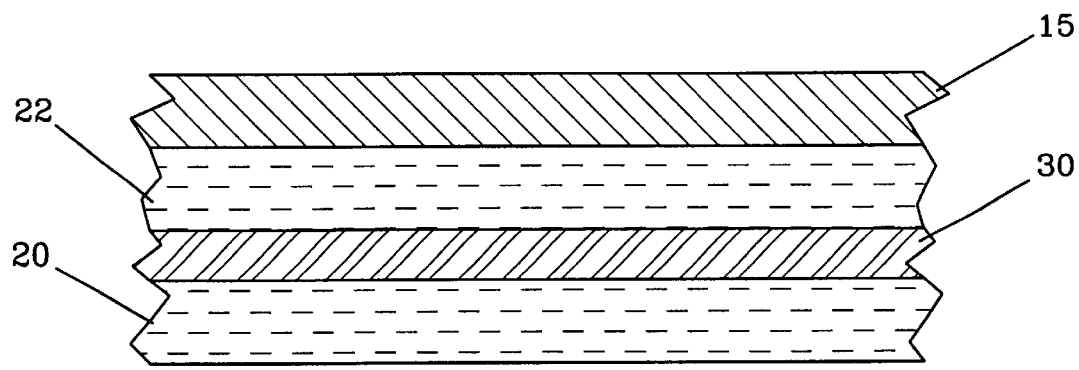

FIG. 8 shows a sectional view of one embodiment of the separator of this invention as a free standing separator and cathode active layer combination comprising (a) a microporous pseudo-boehmite layer 20, (b) a protective coating layer 30, (c) a microporous pseudo-boehmite layer 22, and (d) a cathode active layer 15.

Figure 9:
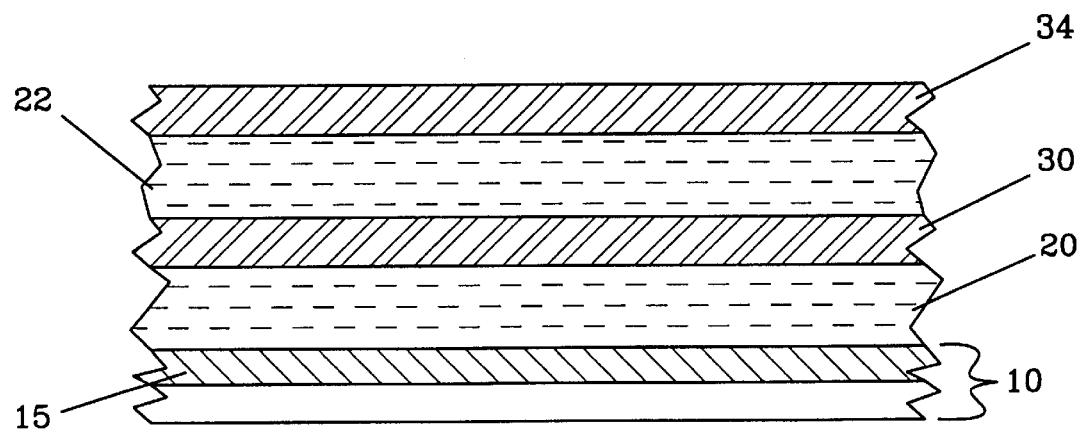

FIG. 9 shows a sectional view of one embodiment of the separator of this invention comprising (a) a first layer 20 comprising microporous pseudo-boehmite, (b) a second layer 30 of a protective coating, (c) a third layer 22 comprising microporous pseudo-boehmite, and (d) a fourth layer 34 of a protective coating, on a substrate 10 comprising a cathode active layer 15.

Figure 10:
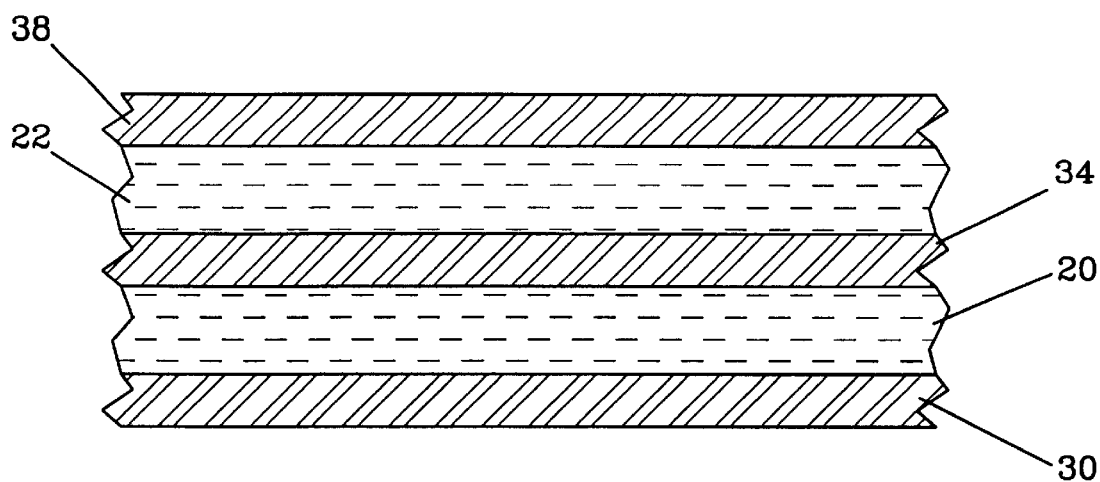

FIG. 10 shows a sectional view of one embodiment of the separator of this invention as a free standing separator comprising (a) a protective coating layer 30, (b) a microporous pseudo-boehmite layer 20, (c) a protective coating layer 34, (d) a microporous pseudo-boehmite layer 22, and (e) a protective coating layer 38.

Figure 11:
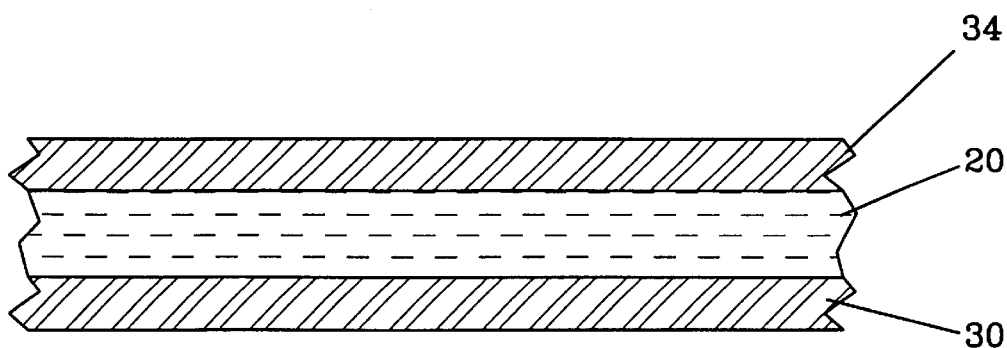

FIG. 11 shows a sectional view of one embodiment of the separator of this invention as a free standing separator comprising (a) a protective coating layer 30, (b) a microporous pseudo-boehmite layer 20, and (c) a protective coating layer 34.

DETAILED DESCRIPTION OF THE INVENTION

The separators of the present invention provide superior electric current producing cell properties, particularly in cells utilizing separators with thicknesses below about 25 microns. Suitable electric current producing cells for use with the separator of the present invention include, but are not limited to, primary and secondary batteries, capacitors including supercapacitors, fuel cells, and electrochemical sensors and displays, including bipolar configurations of batteries and capacitors, as these various electric current producing devices are known in the art. Conventional separators, such as porous polyolefins, porous fluoropolymers where the porosity is provided by a solvent extraction process, and glass fiber papers, and the like, are difficult and costly to manufacture, especially at thicknesses below about 25 microns. Due to the nature of the processes used to manufacture these separators and the relatively large pore sizes intrinsic to these separators, electrical shorting may be a significant challenge at separator thicknesses of below about 25 microns, especially at thicknesses below about 15 microns. To overcome these limitations, the separators of the present invention for use in electric current producing cells comprise (i) at least one microporous pseudo-boehmite layer in contact with (ii) at least one protective coating layer.

Microporous pseudo-boehmite separator layers, as for example, described by Carlson et al. in copending U.S. patent application Ser. No. 08/995,089, to the common assignee, are effective in many electrochemical cell configurations. However, pseudo-boehmite separator layers may lack sufficient strength and flexibility to be configured into cells with, for example, a prismatic configuration. The separator of the present invention provides an improvement whereby the pseudo-boehmite layer of the separator is coated, in one embodiment of the invention, with a protective coating layer comprising a polymer. This protective coating layer provides a protective layer which enhances the strength and adds flexibility to the pseudo-boehmite layer of the separator. Electrochemical cells in a prismatic configuration, such as those described in copending U.S. patent application Ser. No. 09/215,030 to Thibault et al., to the common assignee, may be successfully built with this protective coated pseudo-boehmite separator. Furthermore, the protective coating layer is resistant to electrolytes.

Protective Coating Layer

The separator of the present invention comprises at least one microporous pseudo-boehmite layer wherein the separator is in contact with at least one protective coating layer, and wherein at least one of the at least one protective coating layers is on the anode-facing side of the separator opposite from the cathode active layer of the cell. In embodiments wherein the protective coating layer comprises a polymer, the one or more protective coating layers enhance the strength and add flexibility to separators comprising one or more microporous pseudo-boehmite layers. When the protective coating layer is on the side of the separator opposite from the cathode and when this layer will be in contact with the anode, the protective coating layer may additionally function to reduce or eliminate undesirable degradation of the anode by the electrolyte.

The protective coating layers of the present invention possess a wide range of compositions including compositions which may have porosity and compositions which may lack porosity but may be single ion conductors. The compositions which possess porosity may function as a component of a separator whereas those compositions which lack porosity will not function as a separator component.

In an assembled cell, the protective coating layer of the separator may directly be in contact with the anode surface and thereby provide protection for the anode. Although protection for the anode may be provided, for example, by conductive polymer coating layers or single ion conductive coating layers coated on the anode, it may be more desirable to coat the protective layers as a layer of the separator on the side opposite from the cathode. This configuration in an assembled cell may more effectively accommodate the changes during charge and discharge cycles of the cell, such as, for example, thickness changes of the anode during charge and discharge cycles.

The term "monomer" is used herein to describe the moieties which have a reactive moiety and are capable of reacting to form a polymer.

The term "polymer" is used herein to describe the molecules that have two or more repeating moieties formed from a monomer moiety.

The term "macromonomer" is used herein to describe polymers with molecular weights from several hundreds to tens of thousands with a functional group at the chain end that may be polymerized.

The polymer of the protective coating layers of the separator of the present invention comprises one or more moieties from the polymerization of one or more monomers or macromonomers. Examples of suitable monomers or macromonomers include, but are not limited to, acrylates, methacrylates, olefins, epoxides, vinyl alcohols, vinyl ethers, and urethanes.

Preferred olefinic monomers include, but are not limited to, ethylene, propylene, butene, pentene, hexene, octene, and styrene.

Preferred acrylate monomers or macromonomers include, but are not limited to, polyethylene glycol diacrylates, polypropylene glycol diacrylates, ethoxylated neopentyl glycol diacrylates, ethoxylated bisphenol A diacrylates, ethoxylated aliphatic urethane acrylates, ethoxylated alkylphenol acrylates, and alkylacrylates.

Further examples of suitable polymers for use in the protective coating layer are those comprising one or more moieties formed by polymerization of one or more monomers or macromonomers selected from the group consisting of monomers and macromonomers having the formula:

$$R^1(R^2O)_n-R^3$$

wherein:
R$^1$ is the same or different at each occurrence and is selected from the group consisting of
CH$_2$=CH(C=O)—O—,
CH$_2$=C(CH$_3$)(C=O)—O—,
CH$_2$=CH—,

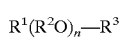

CH$_2$=CH—O—;
R$^2$ is the same or different at each occurrence and is selected from the group consisting of
—CH$_2$—CH$_2$—,
—CH(CH$_3$)—CH$_2$—,
—CH$_2$—CH$_2$—CH$_2$—,
—CH(C$_2$H$_5$)—CH$_2$—,
—CH$_2$—CH$_2$—CH$_2$—CH$_2$—;
R$^3$ is the same or different at each occurrence and is selected from the group consisting of
cyano, methyl, ethyl, propyl, isopropyl, butyl, isobutyl, hexyl, 2-ethylhexyl, decyl, dodecyl, phenyl, butylphenyl, octylphenyl, nonylphenyl, R$^1$, —X—(OR$^2$)$_m$—R$^1$, —Y[(OR$^2$)$_o$—R$^1$]$_2$, —Z[(OR$^2$)$_p$—R$^1$]$_3$;
X is a divalent radical selected from the group consisting of

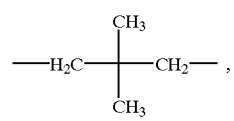

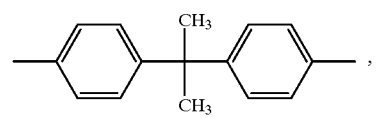

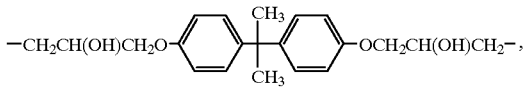

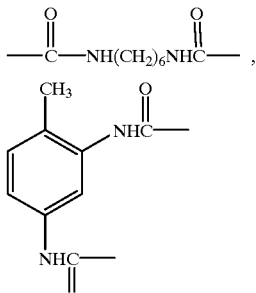

—(CH$_2$)$_r$—, where r is 3, 4, or 6;
Y is a trivalent radical selected from the group consisting of

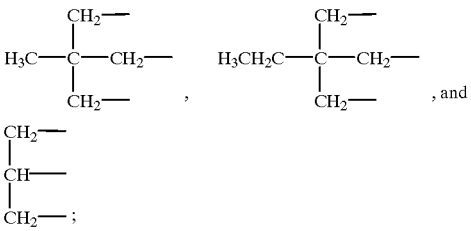

Z is a tetravalent radical selected from the group consisting of

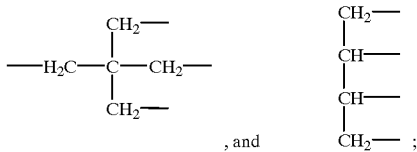

m is an integer ranging from 0 to 100;
n is an integer ranging from 0 to 100;
o is an integer ranging from 0 to 100; and,
p is an integer ranging from 0 to 100.

Yet further examples of suitable polymers for use in the protective coating layer include, but are not limited to, polyacrylates, polymethacrylates, polyolefins, polyurethanes, polyvinyl ethers, polyvinyl pyrrolidones, acrylonitrile-butadiene rubber, styrene-butadiene rubber, acrylonitrile-butadiene-styrene, sulfonated styrene/ethylene-butylene/styrene triblock polymers, and mixtures thereof.

The protective coating layer of the present invention enhances the properties of the one or more pseudo-boehmite layers, for example, it provides flexibility and toughness to the separator. At the same time the protective coating layer should not negatively impact the desired separator properties of the one or more pseudo-boehmite layers. Suitable polymeric protective coating layers should add flexibility and toughness to the separator while at the same time allowing cations, such as lithium ions, to pass through the separator. In one embodiment, it is preferred that the polymeric protective coating layer slow or inhibit the passage of sulfide or polysulfide ions.

Multiphase polymers which are characterized by highly polar segments and less polar segments possess these properties and can be suitable for the protective coating layers. Examples of multiphase polymer structures include but are not limited to: (a) ethylene oxide polydimethylsiloxane graft copolymers as described in U.S. Pat. No. 5,362,493 to Skotheim et al.; (b) block copolymers, for example, sulfonated olefin/styrene polymers, such as sulfonated styrene/ethylene-butylene/styrene triblock copolymers, as described in U.S. Pat. Nos. 5,468,574 and 5,679,482 to Ehrenberg et al., which comprise ion conducting components and flexible connecting components; (c) polymer blends such as described in U.S. Pat. Nos. 5,585,039 and 5,609,795 to Matsumoto et al.; and (d) graft copolymers such as acrylonitrile/butadiene/styrene polymers (ABS) as described in U.S. Pat. No. 4,064,116 to Papetti.

The polymer blends (c) include, but are not limited to, acrylonitrile-butadiene rubber, styrene-butadiene rubber, and mixtures thereof. These polymers are elastomeric and thermoplastic composites and may possess toughness and good dimensional stability. By experimentation one skilled in the art can choose polymer blends with the desired flexibility and toughness in the protective layer. Furthermore, the polar nature of the highly polar segments, for example, from the nitrile function in acrylonitrile, allow cation passage needed for the separator function.

In one embodiment, the protective coating layer on the separator comprises a single ion conductive layer, for example, including, but not limited to, inorganic, organic and mixed organic-inorganic polymeric materials. In one embodiment, the protective coating layer comprises a single ion conductive glass conductive to lithium ions. Among the suitable glasses are those that may be characterized as containing a "modifier" portion and a "network" portion, as known in the art. The modifier is typically a metal oxide of the metal ion conductive in the glass. The network former is typically a metal chalcogenide, such as, for example, a metal oxide or metal sulfide. Suitable single ion conducting glasses include, but are not limited to, lithium silicates, lithium borates, lithium aluminates, lithium phosphates, lithium phosphorus oxynitrides, lithium titanium oxides, lithium lanthanum oxides, lithium silicosulfides, lithium borosulfides, lithium aluminosulfides, lithium germanosulfides, lithium phosphosulfides, and combinations thereof.

In one embodiment, the protective coating layer comprises a conductive polymer. Suitable conductive polymers include those described in U.S. Pat. No. 5,648,187 to Skotheim, for example, including, but not limited to, poly (p-phenylene), polyacetylene, poly(phenylenevinylene), polyazulene, poly(perinaphthalene), polyacenes, and poly (naphthalene-2,6-diyl).

Alternatively, the required porosity of the tough and flexible protective coating layer can be provided by dispersed polar fine pigments in non-polar polymers, such as, for example, silica in olefin polymers. Another approach to porosity in polymer coating layers is the formation of vesicular films. In a vesicular or voided structure the voids or bubbles are produced by decomposing a vesiculating agent by, for example, uv irradiation to generate a gas such as nitrogen upon exposure to light with subsequent heating to expand the size of the void or vesicle. Suitable vesiculating agents include a wide variety of diazo-compounds which liberate nitrogen upon exposure to light such as the quinone-diazides, azides, and carbazide compounds described in U.S. Pat. No. 3,143,418 and conventional diazo-compounds such as those mentioned in U.S. Pat. No. 3,779,768. Suitable resins for producing vesicular coatings are described, for example, in U.S. Pat. No. 4,302,524 to Mandella et al. and U.S. Pat. No. 4,451,550 to Bennett et al.

The molecular weight of the polymer of the protective coating layer is preferably greater than 10,000. More preferred is a polymer of molecular weight greater than 50,000.

The thickness of the protective coating layer comprising a polymer of the separator, may vary over a wide range from about 0.2 microns to about 20 microns. In a preferred embodiment, the protective coating layer has a thickness of from about 0.5 microns to about 15 microns. More preferred is a thickness of from about 0.5 microns to about 10 microns, and even more preferred is a thickness of from about 0.5 microns to about 5 microns, especially when multiple protective coating layers are present. The thickness of the single ion conducting protective coating layer may vary over a wide range from about 5 nm to about 5 microns. More preferably the single ion conducting protective coating layer has a thickness of from about 10 nm to about 2 microns. The thickness of the conductive polymer protective coating layer may also vary over a wide range from about 5 nm to about 5 microns. More preferably the conductive polymer protective coating layer has a thickness of from about 10 nm to about 2 microns.

Conventional separators, such as polyolefin materials, are typically 25 to 50 microns in thickness so it is particularly advantageous that the protective coated microporous separators of this invention can be effective and inexpensive at thicknesses well below 25 microns. In other words, it is preferable that the combined thickness of the one or more pseudo-boehmite layers and the one or more protective coating layers be below 25 microns.

The protective coating layer comprising a polymer of the separator of the present invention may further comprise a pigment. Suitable pigments for use in the polymer protective coating layer include, but are not limited to, colloidal silicas, amorphous silicas, surface treated silicas, colloidal aluminas, amorphous aluminas, conductive carbons, tin oxides, titanium oxides and polyethylene beads. Preferred pigments for use in the polymer protective coating layer are colloidal silicas, amorphous silicas, surface treated silicas, or a combination thereof. Surface treated silicas, including hydrophobic silicas, are especially preferred.

Figure 1:
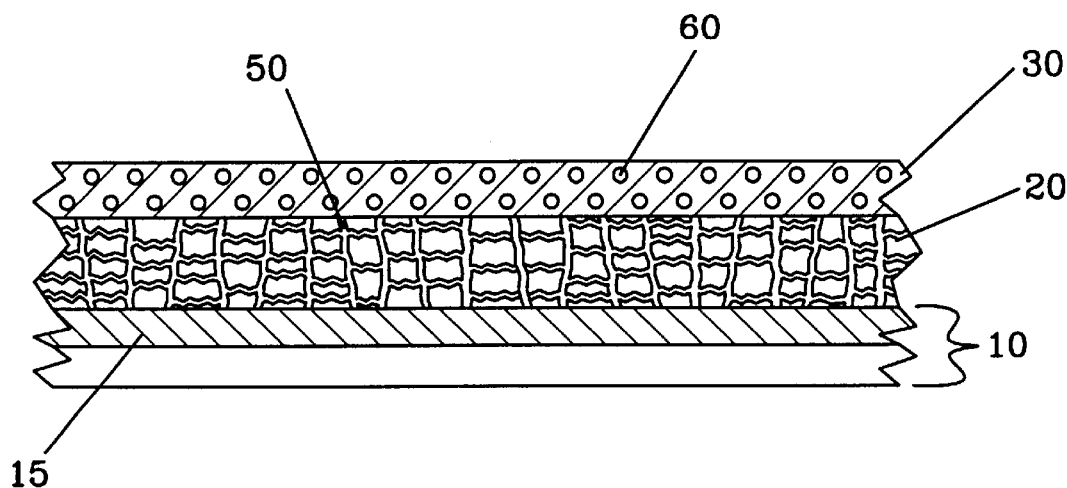
FIG. 1 shows a sectional view of one embodiment of the separator of the present invention comprising (a) a first layer 20 comprising microporous pseudo-boehmite and (b) a second layer 30 of a protective layer, on a substrate 10 comprising a cathode active layer 15. The microporous pseudo-boehmite layer 20 contains a three-dimensional network of pores 50, and the protective coating layer 30 further comprises a pigment 60.
Figure 2:
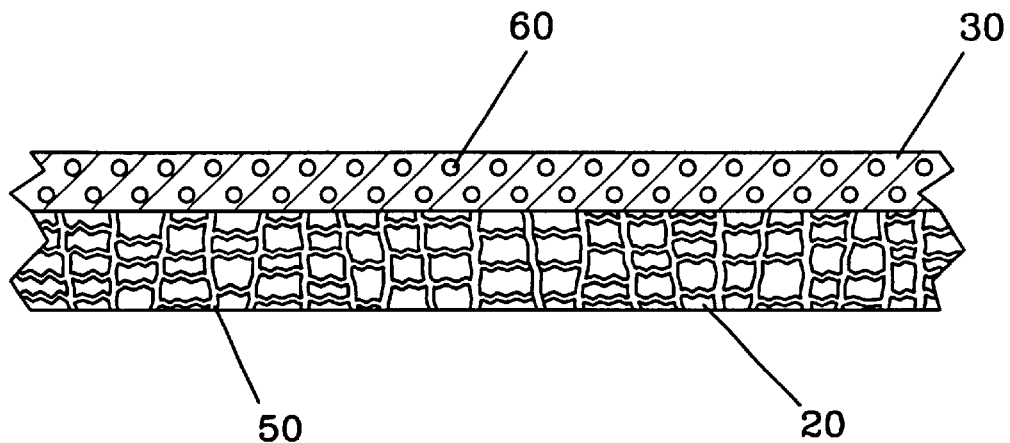
FIG. 2 shows a sectional view of one embodiment of the separator of this invention as a free standing separator comprising (a) a microporous pseudo-boehmite layer 20 and (b) a protective coating layer 30. The pseudo-boehmite layer 20 contains a three-dimensional network of pores 50, and the protective coating layer 30 further comprises a pigment 60.

One embodiment of the separators of this invention is illustrated in FIG. 1, which shows a sectional view of the separator comprising (a) a first layer 20 comprising microporous pseudo-boehmite and (b) a second layer 30 of a protective coating, on a substrate 10 comprising a cathode active layer 15. As used herein, the term "cathode active layer" relates to any layer in the cathode of an electric current producing cell which comprises a cathode active material. The pseudo-boehmite layer 20 contains a three-dimensional network of pores 50, and the protective coating layer 30 further comprises a pigment 60. In one embodiment, as illustrated in FIG. 2, the separator of this invention is a free standing separator comprising (a) a microporous pseudo-boehmite layer 20 and (b) a protective coating layer 30. The pseudo-boehmite layer 20 contains a three-dimensional network of pores 50, and the protective coating layer 30 further comprises a pigment 60.

Figure 3:
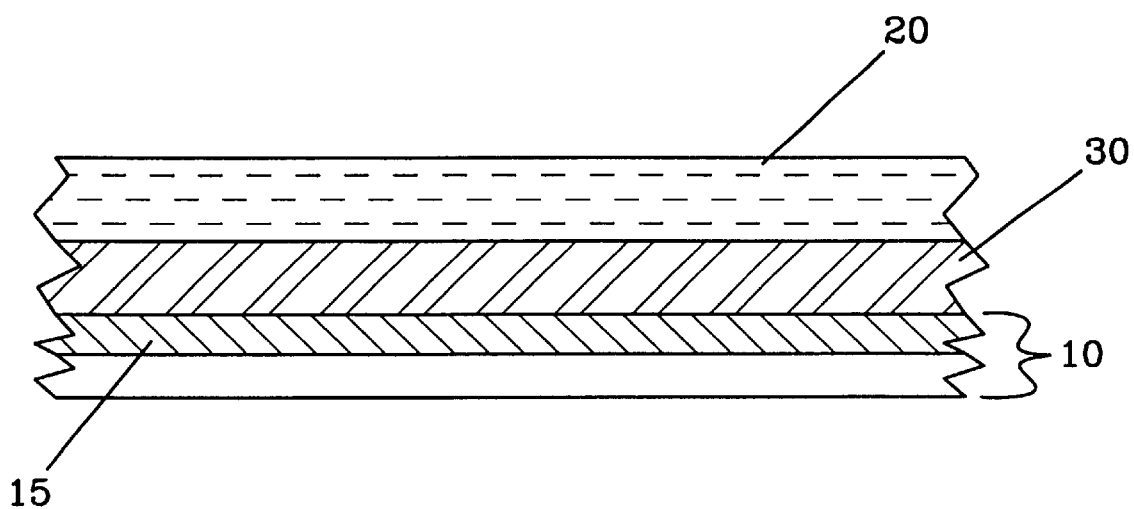
FIG. 3 shows a sectional view of one embodiment of the separator of this invention comprising (a) a first layer 30 of a protective coating and (b) a second layer 20 comprising microporous pseudo-boehmite, on a substrate 10 comprising a cathode active layer 15.

The microporous pseudo-boehmite layers and the protective coating layers of the separators of the present invention may be coated in any order on the substrate. For example, as illustrated in FIG. 3, in one embodiment, the separator comprises (a) a first layer 30 of a protective coating and (b) a second layer 20 comprising microporous pseudo-boehmite, on a substrate 10 comprising a cathode active layer 15.

U.S. Pat. No. 5,463,178 to Suzuki et al. describes an ink jet recording sheet in which a substrate is coated with a porous layer of pseudo-boehmite and a layer of silica is formed on the porous layer of pseudo-boehmite. The silica layer is stated to provide improved abrasion resistance to the recording sheet, but no requirement for a polymer in the layer of silica or for durability during winding and folding, such as occurs in the fabrication of electric current producing cells, is described.

The weight ratio of the polymer to the pigment in the protective coating layer may vary from about 1:10 to about 10:1. In a preferred embodiment, the polymer and the pigment are present in the protective coating layer at a weight ratio of from about 1:4 to about 6:1. In a more preferred embodiment, the polymer and the pigment are present in the protective coating layer at a weight ratio of from about 1:3 to about 4:1.

The particle size or diameter of the pigment is preferably larger than the average pore diameter of the pseudo-boehmite layer so that the pigment does not penetrate pores of the pseudo-boehmite layer, in those cases where the protective coating layer comprises a pigment and is coated onto a microporous pseudo-boehmite layer. The particle size of the pigment may range from about 10 nm to about 10,000 nm. In a preferred embodiment, the pigment has a particle size from about 20 nm to about 6,000 nm. In a most preferred embodiment, the pigment has a particle size from about 50 nm to about 3,000 nm.

In addition to polymer and pigments, the protective coating layer of the separators of the present invention may further comprise other additives as are known in the art for coatings, especially those known for use in flexible and durable coatings. Examples of suitable other additives include, but are not limited to, photosensitizers for radiation curing of any monomers and macromonomers present, catalysts for non-radiation curing of any monomers, macromonomers, or polymers present, crosslinking agents such as zirconium compounds, aziridines, and isocyanates, surfactants, plasticizers, dispersants, flow control additives, and rheology modifiers.

Microporous Pseudo-Boehmite Layer

Microporous pseudo-boehmite layers for use as separators in electrochemical cells are described in copending U.S. patent application Ser. Nos. 08/995,089 and 09/215,112, both to Carlson et al., of the common assignee.

The term "pseudo-boehmite," as used herein, pertains to hydrated aluminum oxides having the chemical formula $Al_2O_3 \cdot xH_2O$ wherein x is in the range of from 1.0 to 1.5.

Terms used herein, which are synonymous with "pseudo-boehmite," include "boehmite," "AlOOH," and "hydrated alumina." The materials referred to herein as "pseudo-boehmite" are distinct from anhydrous aluminas ($Al_2O_3$, such as alpha-alumina and gamma-alumina), and hydrated aluminum oxides of the formula $Al_2O_3 \cdot xH_2O$ wherein x is less than 1.0 or greater than 1.5.

The term "microporous," is used herein to describe the material of a layer, which material possesses pores of diameter of about 10 microns or less which are connected in a substantially continuous fashion from one outermost surface of the layer through to the other outermost surface of the layer. Porous separators which are made from fibers, such as glass, TEFLON (a trademark for polytetrafluoroethylene available from DuPont Corporation, Wilmington, Del.), and polypropylene, are generally characterized as non-woven separator materials and have pore diameters too large to be called microporous, thereby making them unacceptable for rechargeable cells where dendrite formation is a potential concern.

The amount of these pores in the layer may be characterized by the pore volume, which is the volume in cubic centimeters of pores per unit weight of the layer. The pore volume may be measured by filling the pores with a liquid having a known density and then calculated by the increase in weight of the layer with the liquid present divided by the known density of the liquid and then dividing this quotient by the weight of the layer with no liquid present, according to the equation:

$$\text{Pore Volume} = \frac{[W_1 - W_2]/d}{W_2} \qquad \text{I}$$

where $W_1$ is the weight of the layer when the pores are completely filled with the liquid of known density, $W_2$ is the weight of the layer with no liquid present in the pores, and d is the density of the liquid used to fill the pores. Also, the pore volume may be estimated from the apparent density of the layer by subtracting the reciprocal of the theoretical density of the materials (assuming no pores) comprising the microporous layer from the reciprocal of the apparent density or measured density of the actual microporous layer, according to the equation:

$$\text{Pore Volume} = \left(\frac{1}{d_1} - \frac{1}{d_2}\right) \qquad \text{II}$$

where $d_1$ is the density of the layer which is determined from the quotient of the weight of the layer and the layer volume as determined from the measurements of the dimensions of the layer, and $d_2$ is the calculated density of the materials in the layer assuming no pores are present or, in other words, $d_2$ is the density of the solid part of the layer as calculated from the densities and the relative amounts of the different materials in the layer. The porosity or void volume of the layer, expressed as percent by volume, can be determined according to the equation:

$$\text{Porosity} = \frac{100(\text{Pore Volume})}{[\text{Pore Volume} + 1/d_2]} \qquad \text{III}$$

where pore volume is as determined above, and $d_2$ is the calculated density of the solid part of the layer, as described above.

In one embodiment, the microporous pseudo-boehmite layer of the separator of the present invention has a pore volume from 0.02 to 2.0 cm³/g. In a preferred embodiment, the microporous pseudo-boehmite layer has a pore volume from 0.3 to 1.0 cm³/g. In a more preferred embodiment, the microporous pseudo-boehmite layer has a pore volume from 0.4 to 0.7 cm³/g. Below a pore volume of 0.02 cm³/g, the transport of ionic species is inhibited by the reduced pore volume. Above a pore volume of 2.0 cm³/g, the amount of voids are greater which reduces the mechanical strength of the microporous pseudo-boehmite layer.

In contrast to conventional microporous separators which typically have pore diameters on the order of 1 to 10 microns, the microporous pseudo-boehmite layers of the separator of the present invention have pore diameters which range from about 1 micron down to less than 0.002 microns. Microporous separator layers, such as the microporous pseudo-boehmite layers of the present invention, with pore diameters in the range of about 1 micron (100 nm) down to less than 0.002 microns (2 nm) are also commonly referred to in the art as nanoporous materials. In one embodiment, the microporous pseudo-boehmite layer has an average pore diameter from 0.001 microns or 1 nm to 0.3 microns or 300 nm. In a preferred embodiment, the microporous pseudo-boehmite layer has an average pore diameter from 2 nm to 30 nm. In a more preferred embodiment, the microporous pseudo-boehmite layer has an average pore diameter from 3 nm to 10 nm.

One distinct advantage of separators with much smaller pore diameters on the order of 0.001 to 0.03 microns is that insoluble particles, even colloidal particles with diameters on the order of 0.05 to 1.0 microns, can not pass through the separator because of the ultrafine pores. In contrast, colloidal particles, such as the conductive carbon powders often incorporated into cathode compositions, can readily pass through conventional separators, such as microporous polyolefins, and thereby can migrate to undesired areas of the cell.

Another significant advantage of the separators of the present invention comprising a microporous pseudo-boehmite layer over conventional separators is that the nanoporous structure of the microporous pseudo-boehmite layer may function as an ultrafiltration membrane and, in addition to blocking all particles and insoluble materials, may block or significantly inhibit the diffusion of soluble materials of relatively low molecular weights, such as 2,000 or higher, while permitting the diffusion of soluble materials with molecular weights below this cutoff level. This property may be utilized to advantage in selectively impregnating or imbibing materials into the separator layers during manufacture of the electric current producing cell or in selectively permitting diffusion of very low molecular weight materials through the separator during all phases of the operation of the cell while blocking or significantly inhibiting the diffusion of insoluble materials or of soluble materials of medium and higher molecular weights.

Another important advantage of the extremely small pore diameters of the separators of the present invention is the strong capillary action of the tiny pores in the pseudo-boehmite layer which enhances the capability of the separators to readily take up or imbibe electrolyte liquids and to retain these materials in the pores.

The microporous pseudo-boehmite layer may optionally further comprise a variety of binders to improve the mechanical strength and/or other properties of the layer, as for example, described in the two aforementioned copending U.S. patent applications, both to Carlson et al. of the common assignee. Any binder that is compatible with the boehmite sol during mixing and processing into the microporous layer and provides the desired mechanical strength and uniformity of the layer without significantly interfering with the desired microporosity is suitable for use. The preferred amount of binder is from 5% to 70% of the weight of the pseudo-boehmite in the layer. Below 5 weight percent, the amount of binder is usually too low to provide a significant increase in mechanical strength. Above 70 weight percent, the amount of binder is usually too high and fills the pores to an excessive extent which may interfere with the transport of low molecular weight materials through the microporous layer. The binder may be inorganic, such as for example, silicas, gamma aluminum oxides, and alpha aluminum oxides, that are known to typically form gel matrix structures with pseudo-boehmite present, for example, as is known in the art of microporous sol gel ink receptive layers for ink jet printing. Preferably, the binders in the microporous pseudo-boehmite layer are organic polymer binders. Examples of suitable binders include, but are not limited to, polyvinyl alcohols, polyethylene oxides, polyvinyl pyrrolidones, copolymers thereof, and mixtures thereof. Binders may be water soluble polymers and may have ionically conductive properties. Further preferred binders may also comprise plasticizer components such as, but not limited to, low molecular weight polyols, polyalkylene glycols, and methyl ethers of polyalkylene glycols to enhance the coating, drying and flexibility of the pseudo-boehmite layer.

The thickness of the microporous pseudo-boehmite layer, with or without additional binder, for use in the separator of the present invention may vary over a wide range since the basic properties of microporosity and mechanical integrity are present in layers of a few microns in thickness as well as in layers with thicknesses of hundreds of microns. For various reasons including cost, overall performance properties of the separator, and ease of manufacturing, the desirable thicknesses of the microporous pseudo-boehmite layer are in the range of 1 micron to 50 microns. Preferred are thicknesses in the range of 1 micron to 25 microns. The more preferred thicknesses are in the range of 2 microns to 15 microns. The most preferred thicknesses are in the range of 5 microns to 15 microns. Conventional separators, such as the porous polyolefin materials, are typically 25 to 50 microns in thickness so it is particularly advantageous that the microporous separators of this invention can be effective and inexpensive at thicknesses well below 25 microns.

The separators of this invention comprising a protective coated microporous pseudo-boehmite layer essentially retain the desirable properties of the uncoated pseudo-boehmite separator as described by Carlson et al. in the two aforementioned copending U.S. patent applications to the common assignee. These include blocking particles and insoluble materials, blocking or inhibiting the diffusion of soluble materials of relatively low molecular weights, such as 2,000 or higher, while permitting the diffusion of soluble materials with molecular weights below this cutoff level. Desirable properties also include permitting the diffusion of soluble materials especially electrolyte cations such as lithium ions. In other words, in a preferred embodiment, the polymer coating does not significantly modify the ability of the microporous pseudo-boehmite layer to allow the flow of desirable materials but may inhibit or at least slow the flow of undesirable materials.

Separators with Multiple Microporous Pseudo-Boehmite Layers and/or Protective Coating Layers The separators of the present invention may have more than one microporous pseudo-boehmite layer, for example, as illustrated in FIGS. 4 to 10. Also, the separators of the present invention may have more than one protective coating layer, for example, as illustrated in FIGS. 9 to 11. The compositions of these multiple microporous pseudo-boehmite layers may be the same or different for each such layer in the separator. Also, the compositions of these multiple protective coating layers may be the same or different for each such layer in the separator.

Figure 4:
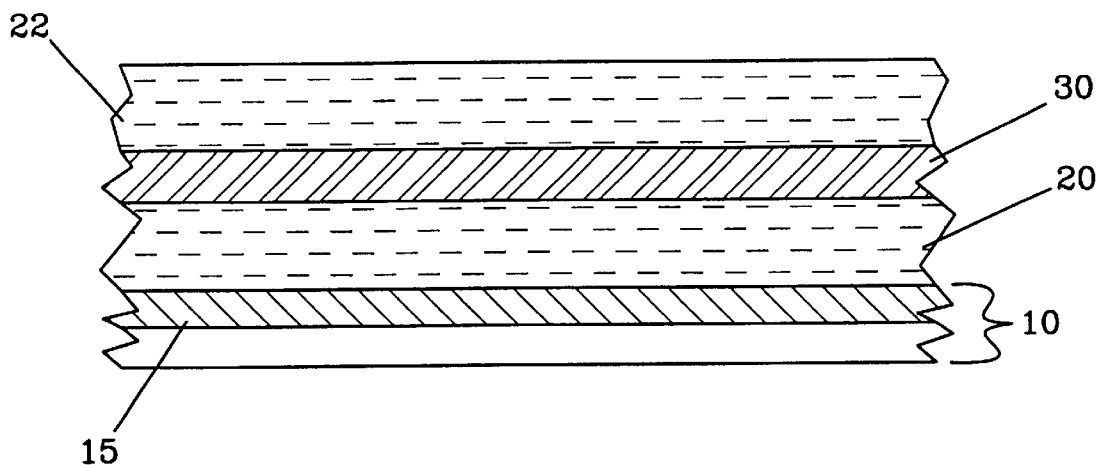
FIG. 4 shows a sectional view of one embodiment of the separator of this invention comprising (a) a first layer 20 comprising microporous pseudo-boehmite, (b) a second layer 30 of a protective coating, and (c) a third layer 22 comprising microporous pseudo-boehmite, on a substrate 10 comprising a cathode active layer 15.

In one embodiment, as illustrated in FIG. 4, the separator of this invention comprises (a) a first layer 20 comprising microporous pseudo-boehmite, (b) a second layer 30 of a protective coating, and (c) a third layer 22 comprising microporous pseudo-boehmite, on a substrate 10 comprising a cathode active layer 15. When the separator of this invention is subsequently utilized as a free standing separator, the separator may be conveniently formed on a release substrate, as illustrated in FIG. 5, from which it may be delaminated to provide a free standing separator, as shown in FIG. 6. In one embodiment, as illustrated in FIG. 5, the separator of the present invention comprises (a) a first layer 20 comprising microporous pseudo-boehmite, (b) a second layer 30 of a protective coating, and (c) a third layer 22 comprising microporous pseudo-boehmite, on a smooth release substrate 12. In one embodiment, as illustrated in FIG. 6, the separator of this invention comprises (a) a microporous pseudo-boehmite layer 20, (b) a protective coating layer 30, and (c) a microporous pseudo-boehmite layer 22.

As another example of the wide variety of options for designs of the layers of the separators of the present invention and of the order of these layers relative to a substrate or to a cathode active layer, FIG. 7 shows a sectional view of one embodiment of the separators of this invention comprising (a) a first layer 20 comprising microporous pseudo-boehmite, (b) a second layer 30 of a protective coating, (c) a third layer 22 comprising microporous pseudo-boehmite, and (d) a fourth layer 15 of a cathode active layer, on a smooth release substrate 12. Also, the separator illustrated in FIG. 7 may be delaminated to provide a free standing separator and cathode active layer combination, as shown in FIG. 8. In one embodiment, as illustrated in FIG. 8, the separator of the present invention comprises a separator and cathode active layer combination comprising (a) a microporous pseudo-boehmite layer 20, (b) a protective coating layer 30, (c) a microporous pseudo-boehmite layer 22, and (d) a cathode active layer 15.

The separators of the present invention may comprise two or more microporous pseudo-boehmite layers and two or more protective coating layers, as, for example, illustrated in FIGS. 9 to 11. In one embodiment, as illustrated in FIG. 9, the separator of this invention comprises (a) a first layer 20 comprising microporous pseudo-boehmite, (b) a second layer 30 of a protective coating, (c) a third layer 22 comprising microporous pseudo-boehmite, and (d) a fourth layer 34 of a protective coating comprising a polymer, on a substrate 10 comprising a cathode active layer 15. Also, for example, in one embodiment, as illustrated in FIG. 10, the separator of the present invention is a free standing separator comprising (a) a protective coating layer 30, (b) a microporous pseudo-boehmite layer 20, (c) a protective coating layer 34, (d) a microporous pseudo-boehmite layer 22, and (e) a protective coating layer 38 comprising a polymer. Also, for example, in another embodiment, as illustrated in FIG. 11, the separator of the present invention is a free standing separator comprising (a) a protective coating layer 30, (b) a microporous pseudo-boehmite layer 20, and (c) a protective coating layer 34.

As a further example of the options for designs of the layers of the separator of the present invention, and of the relative order of the pseudo-boehmite layers and protective coating layers, two or more layers of one type may be in contact with each other, as for example, illustrated by the two protective layers overlying a pseudo-boehmite layer described in Example 10.

Yet another example of the options for designs of the separator for use in an electrochemical cell of the present invention, is an embodiment in which a microporous pseudo-boehmite layer is in contact with a protective coating layer upon which is coated a second protective coating layer; wherein the protective coating layers are on the side of the separator opposite from the cathode active layer of the cell. In one embodiment, the second protective coating layer is a single ion conducting layer, preferably a single ion conducting glass.

Methods for Forming Separators

One aspect of the present invention pertains to methods of making a separator comprising (i) at least one microporous pseudo-boehmite layer in contact with (ii) at least one protective coating layer, for use in electric current producing cells which overcomes the disadvantages of the aforementioned conventional methods for forming separators.

In one aspect of the method of the present invention to form a separator comprising (i) at least one microporous pseudo-boehmite layer in contact with (ii) at least one protective coating layer, as described herein. In one embodiment, wherein the protective coating layer comprises a polymer, the method comprises the steps of: (a) coating onto a substrate a first liquid mixture, A, comprising a boehmite sol, or alternatively, coating onto a substrate a first liquid mixture, B, comprising one or more polymers, monomers, or macromonomers, to form a first coating layer; (b) drying the first coating layer formed in step (a) to form a microporous pseudo-boehmite layer, if the first liquid mixture A was utilized in step (a), or alternatively, drying the first coating layer formed in step (a) to form a protective coating layer, if the first liquid mixture B was utilized in step (a), to form a dried first coating layer; (c) coating onto the layer formed in step (b) a second liquid mixture, B', comprising one or more polymers, monomers, or macromonomers to form a second coating layer, if a microporous pseudo-boehmite layer was formed in step (b), or alternatively, coating onto the layer formed in step (b) a second liquid mixture, A', comprising a boehmite sol, if a protective coating layer was formed in step (b), to form a second coating layer; (d) drying the second coating layer formed in step (c) to form a protective coating layer, as described herein, if the second liquid mixture B' was utilized in step (c), or alternatively, to form a microporous pseudo-boehmite layer, as described herein, if the second liquid mixture A' was utilized in step (c), to form a dried second coating layer.

In one embodiment, subsequent to formation of a protective coating layer, the methods further comprise curing the dried protective coating layer to form a cured protective coating layer. The dried coating layer may be cured to form a cured protective coating layer comprising a cured polymer by treatment with an energy source. Suitable energy sources include, but are not limited to, heat, ultraviolet light, visible light, infrared radiation, and electron beam radiation. In one embodiment, after step (d), steps (a) and (b) are repeated to form a third coating layer. Examples of separators that may be formed by this method of forming a third coating layer are illustrated by FIGS. 4 to 8 and 11. In one embodiment, after step (d), steps (a), (b), (c), and (d) are repeated to form a third coating layer and a fourth coating layer. An example of separators that may be formed by this method of forming a third coating layer and a fourth coating layer is illustrated in FIG. 9. In one embodiment, steps, (a), (b), (c), (d), (a) and (b) are repeated to form a third coating layer, a fourth coating layer, and a fifth coating layer, as illustrated, for example in FIG. 10.

Examples of suitable monomers and macromonomers for use in the liquid mixture to form the protective coating layer include, but are not limited to, acrylates, methacrylates, olefins, epoxides, vinyl alcohols, vinyl ethers, and urethanes. Suitable acrylate monomers and macromonomers, include but are not limited to, compounds selected from the group consisting of: polyethylene glycol diacrylates, polypropylene glycol diacrylates, ethoxylated neopentyl glycol diacrylates, ethoxylated bisphenol A diacrylates, ethoxylated aliphatic urethane acrylates, and ethoxylated alkylphenol acrylates. Further, the monomers and macromonomers of the liquid mixture may be selected from monomers and macromonomers having the formula $R^1(R^2O)_n—R^3$, as described herein, to form the protective coating layer.

The molecular weight of the monomers and macromonomers of the liquid mixture may be selected so that the liquid mixture to form the protective coating layer does not significantly impregnate into pores of the microporous pseudo-boehmite layer, in those cases where the liquid mixture to form a protective coating layer is coated onto a microporous pseudo-boehmite layer. In a preferred embodiment, the molecular weight of the monomers and macromonomers is greater than 2000. In a more preferred embodiment, the molecular weight of the monomers and macromonomers is greater than 5000.

In one embodiment, the second liquid mixture, B or B', may comprise a solvent. The solvent may be aqueous or non-aqueous. Suitable solvents include, but are not limited to, water, acetone, methyl ethyl ketone, acetonitrile, benzene, toluene, tetrahydrofuran, dioxane, chloroform, pentane, hexane, cyclohexane, methyl acetate, ethyl acetate, butyl acetate, and methylene chloride. In one embodiment, the solvent of the liquid mixture may comprise one or more of the monomers of the present invention.

In one embodiment, the liquid mixture to form the protective coating layer is in the form of a polymer latex. The term "latex," as used herein, pertains to a stable colloidal dispersion of a polymeric substance in an aqueous medium.

The penetration of the liquid mixture to form the protective coating layer into pores of the microporous pseudo-boehmite layer may also be controlled by selecting the viscosity of the liquid mixture. For example, an additive, such as a polymer may be added to the liquid mixture that forms the protective coating layer to increase the viscosity and to inhibit or slow the penetration of the liquid mixture into pores of the pseudo-boehmite layer. Examples of polymer additives include, but are not limited to, polyacrylates, polymethacrylates, polyurethanes, polyolefins, for example, ethylene-propylene polymers, and cellulosics. Alternatively, for example, additional solvent may be used to lower the viscosity of the liquid mixture. Preferably, the liquid mixture to form the protective coating layer has a viscosity in the range of 15 cP to 5000 cP. Besides particle size, molecular weight, and viscosity, other approaches to prevent or minimize the penetration of the liquid mixture that forms the protective coating layer into pores of the microporous pseudo-boehmite layer include, but are not limited to, prewetting the pseudo-boehmite layer with a solvent to hold out the protective coating layer during the coating and drying steps.

Where there is a defect, such as a small crack, in the microporous pseudo-boehmite layer, the liquid mixture to form the protective coating layer may be advantageously utilized to penetrate into the defect areas of the pseudo-boehmite layer to repair the defects where this is beneficial. This is one of the advantages of the methods of forming a separator of the present invention.

If increased mechanical strength or some other improvement in the properties of the protective coating layer of the separator is desired, the coating liquid mixture to form the protective coating layer may further comprise a pigment, and the resulting protective coating layer is dried and optionally cured to form the protective coated microporous pseudo-boehmite separator. Suitable pigments for use in the protective coating layer include, but are not limited to, colloidal silicas, amorphous silicas, surface treated silicas, colloidal aluminas, amorphous aluminas, conductive carbons, graphites, tin oxides, titanium oxides and polyethylene beads. Preferred pigments for use in the polymer protective coating layer are colloidal silicas, amorphous silicas, surface treated silicas, or a combination thereof. Surface treated silicas, including hydrophobic silicas, are especially preferred.

The single ion conducting glass protective coating layer or the conductive polymer protective coating layer may be deposited on the substrate by techniques such as physical deposition, for example, by sputtering or evaporation, and chemical vapor deposition, for example, by plasma enhanced chemical vapor deposition. These protective coating layers may be advantageously applied to allow only lithium ions to reach the anode surface. Other protective coating layers comprising single ion conductive layers may be deposited as sol gel formulations by methods known in the art for coating sol gel layers.

If increased mechanical strength or some other improvements such as improved adhesion to the substrate or coating uniformity is desired in the microporous pseudo-boehmite layer, the liquid mixture comprising a boehmite sol may further comprise a binder, as described herein, and then dried to form a microporous pseudo-boehmite layer with binder present. The types of the binders such as polyvinyl alcohols, the amounts of the binder materials, such as, in the range of 5 to 70% of the weight of the pseudo-boehmite in the layer, and the thicknesses of the microporous pseudo-boehmite layer with binder in the range of 1 to 50 microns, preferably 1 to 25 microns, more preferably 2 to 15 microns, and most preferably 5 to 15 microns, are as described herein for the microporous pseudo-boehmite separator.

These methods of forming a separator comprising (i) at least one microporous pseudo-boehmite layer with or without a binder present in the pseudo-boehmite layer, as described herein, in contact with (ii) at least one protective polymer coating, as described herein, may be used to produce either a free standing separator or a separator coated directly onto a layer of an electric current producing cell. The free standing separator may then be wound or otherwise fabricated into an electric current producing cell. Also, the free standing separator may be laminated to another layer of the electric current producing cell. In one embodiment of the methods of forming the separators of this invention, wherein the protective coating layer comprises a polymer, the separator is coated directly onto the cathode active layer of the cathode of the electric current producing cell by (a) application of a first liquid mixture, A, comprising a boehmite sol or, alternatively, a first liquid mixture, B, comprising one or more polymers, monomers or macromonomers for forming a protective coating layer, onto the outermost surface of a cathode coating on a suitable current collector substrate; (b) drying this first liquid coating layer formed in step (a) to form a microporous pseudo-boehmite separator layer, as described herein, or alternatively, drying the first coating layer formed in step (a) to form a protective coating layer, as described herein; (c) coating onto the layer formed in step (b) a second liquid mixture, B', comprising one or more polymers, monomers, or macromonomers to form a second coating layer, if a microporous pseudo-boehmite layer was formed in step (b), or alternatively, coating onto the layer formed in step (b) a second liquid mixture, A', comprising a boehmite sol, if a protective coating layer was formed in step (b), to form a second coating layer; (d) drying the second coating layer formed in step (c) to form a protective coating layer, as described herein, if the second liquid mixture B' was utilized in step (c), or alternatively, to form a microporous pseudo-boehmite layer, as described herein, if the second liquid mixture A' was utilized in step (c), to form a dried second coating layer, as described herein. Optionally, subsequent to the formation of a protective coating layer the methods may further comprise curing the dried protective coating layer to form a cured protective coating layer, as described herein. If the protective coating layer further comprises a pigment, one embodiment of the separator formed by this method is illustrated in FIG. 1. If the protective coating layer is applied first to the substrate and further comprises a pigment, one embodiment of the separator formed by this method is illustrated in FIG. 3.

In another embodiment, a free standing separator is formed by application of: (a) a first liquid mixture, A, comprising a boehmite sol or, alternatively, a first liquid mixture, B, comprising one or more polymers, monomers or macromonomers for forming a protective coating layer, onto a substrate; (b) drying this first liquid coating layer formed in step (a) to form a microporous pseudo-boehmite separator layer, as described herein, or alternatively, drying the first coating layer formed in step (a) to form a protective coating layer, as described herein; (c) coating onto the layer formed in step (b) a second liquid mixture, B', comprising one or more polymers, monomers, or macromonomers to form a second coating layer, if a microporous pseudo-boehmite layer was formed in step (b), or alternatively, coating onto the layer formed in step (b) a second liquid mixture, A', comprising a boehmite sol, if a protective coating layer was formed in step (b), to form a second coating layer; (d) drying the second coating layer formed in step (c) to form a protective coating layer, as described herein, if the second liquid mixture B' was utilized in step (c), or alternatively, to form a microporous pseudo-boehmite layer, as described herein, if the second liquid mixture A' was utilized in step (c), to form a dried second coating layer; and, then (e) delaminating the coated separator multilayer structure formed in the previous step from the substrate to provide a free standing separator comprising one or more microporous pseudo-boehmite layers in contact with one or more protective coating layers, as described herein. Optionally, subsequent to the formation of a protective coating layer the methods may further comprise curing the dried protective coating layer to form a cured protective coating layer, as described herein. If the protective coating layer further comprises a pigment, one embodiment of the separator formed by this method is illustrated in FIG. 2. The substrate is selected to have weak adhesion to the first coated layer so that the separator coating may be readily delaminated from the substrate without damaging the separator. Suitable substrates include, but are not limited to, papers with release coatings, such as silicones, fluorocarbons, and polyolefins, on the surface that receives the first liquid mixture and flexible plastic films, such as polyester and polystyrene films, either untreated or with release coatings on the surface that receives the first liquid mixture. The width of the coated separator when it is delaminated from the substrate may be the full width as coated on the substrate or the coated separator may be slit to a narrower width, such as the width desired for use in the specific electric current producing cell, before it is delaminated from the substrate.

After delamination of the coated separator, the resulting free standing coated separator may be utilized directly to form an electric current producing cell using methods known in the art of fabricating cells with free standing separators. Alternatively, for example, a second protective coating layer may be applied to the uncoated side of the pseudo-boehmite layer of the free standing separator; and/or the free standing coated separator may be laminated to a cathode active layer on a substrate, to a cathode active layer and a cathode current collector, to an anode, or to an anode and anode current collector, prior to fabrication into an electric current producing cell.

A further distinct advantage of the methods to produce a separator of the present invention is the flexibility in the coating patterns in which the separator layer may be applied to the substrate. For example, the separator layers may be applied over the entire outermost surface of the cathode including the top surface and sides of the cathode active layer on the current collector and cathode substrate. The cathode active layer may thus be completely encapsulated on all outermost surfaces, including the edges or sides of the cathode active layer which are not contacted or covered by conventional free standing polyolefin or other porous separators, by coating the separator layers in a pattern over all the outermost, exposed surfaces of the cathode active layer. This complete encapsulation by the separator layers of the present invention is very advantageous to safety and battery performance in providing an insulating surface to prevent any short circuits by the cathode during fabrication and during the use of the electric current producing cell. This encapsulation is also very advantageous to high cell capacity and long cycle life in acting as a barrier in blocking or inhibiting the migration of any insoluble or high molecular weight species in the cathode active layer to outside the cathode area and similarly in retarding the diffusion of any low molecular weight species., such as soluble polysulfides, in the cathode active layer to outside the cathode area.

Electrolyte Elements and Methods of Preparing Same

The present invention provides an electrolyte element for use in an electric current producing cell, by combining the separator of the present invention, as described herein, with an electrolyte contained within the pores of the separator. The electrolyte may be any of the types of non-aqueous and aqueous electrolytes known in the art.

One aspect of the methods of making electrolyte elements for an electric current producing cell of the present invention comprises the steps of: (a) coating a first liquid mixture, as described herein, onto a substrate; (b) drying the first coating layer, as described herein; (c) coating on the first coating layer formed in step (b) a second liquid mixture, as described herein; (d) drying this second coating layer, as described herein, to form a separator layer comprising a protective coating layer comprising a polymer in contact with a microporous pseudo-boehmite layer, as described herein in the methods of making a separator; and, (e) subsequently contacting the surfaces of this protective coated microporous pseudo-boehmite layer with an electrolyte, preferably an organic electrolyte, thereby causing infusion of the electrolyte into pores of the separator. Optionally, after the formation of the protective coating layer and prior to step (e), the protective coating layer may be cured by an energy source, to form a cured protective coated separator, as described herein. Prior to the infusion of the electrolyte, the microporous pseudo-boehmite layer typically has a pore volume from 0.02 to 2.0 $cm^3/g$ and an average pore diameter from 1 nm to 300 nm, as described herein for the microporous pseudo-boehmite separator.

If increased mechanical strength or some other improvements such as improved adhesion to the substrate or coating uniformity is desired, the coating liquid mixture comprising a boehmite sol, as described herein, may further comprise a binder and then is dried to form a microporous pseudo-boehmite layer with binder present, as described herein. The coating liquid mixture comprising a polymer, monomer or macromonomer may further comprise a pigment, a second polymer, or other additive, as described herein.

In a preferred embodiment, the method of producing the electrolyte element comprises (a) providing a substrate with a cathode active layer on at least one of its outermost surfaces; (b) coating a first liquid mixture onto this cathode active layer; (c) drying this first coating layer formed in step (b) to form a microporous pseudo boehmite layer, as described herein, or alternatively, a protective coated layer comprising a polymer, as described herein; (d) coating onto the first coating layer a second liquid mixture, as described herein; (e) drying this second coating layer formed in step (d) to form a protective coated microporous pseudo-boehmite separator; and (f) contacting the surfaces of the protective coated microporous pseudo-boehmite separator with an organic electrolyte thereby causing infusion of the electrolyte into pores of the separator. Optionally, after formation of the protective coating layer and before step (f), there is a step of curing the protective coating layer comprising a polymer, as described herein.

The electrolyte used in the present invention functions as a medium for storage and transport of ions, and may be any of the types of electrolytes known in the art of electric current producing cells. Any liquid, solid, or solid-like material capable of storing and transporting ions may be used, so long as the material is sufficiently chemically and electrochemically stable with respect to the anode and the cathode and the material facilitates the transportation of ions between the anode and the cathode without providing electrical conductivity that might cause a short circuit between the anode and the cathode.

Examples of suitable electrolytes for use in the electrolyte elements of the present invention include, but are not limited to, organic electrolytes comprising one or more electrolytes selected from the group consisting of liquid electrolytes, gel polymer electrolytes, and solid polymer electrolytes.

Examples of useful liquid electrolytes include, but are not limited to, those comprising one or more electrolyte solvents selected from the group consisting of N-methyl acetamide, acetonitrile, carbonates, sulfones, sulfolanes, aliphatic ethers, cyclic ethers, glymes, siloxanes, dioxolanes, N-alkyl pyrrolidones, substituted forms of the foregoing, and blends thereof; to which is added an appropriate ionic electrolyte salt.

The electrolyte solvents of these liquid electrolytes are themselves useful as plasticizers in semi-solid or gel polymer electrolytes. Useful gel polymer electrolytes include, but are not limited to, those comprising, in addition to one or more electrolyte solvents sufficient to provide the desired semi-solid or gel state, one or more polymers. Examples of suitable polymers include, but are not limited to those selected from the group consisting of polyethylene oxides (PEO), polypropylene oxides, polyacrylonitriles, polysiloxanes, polyphosphazenes, polyimides, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing; to which is added an appropriate ionic electrolyte salt.

Solid polymer electrolytes useful in the present invention include, but are not limited to, those comprising one or more polymers selected from the group consisting of: polyethers, polyethylene oxides (PEO), polypropylene oxides, polyimides, polyphosphazenes, polyacrylonitriles (PAN), polysiloxanes, polyether grafted polysiloxanes, derivatives of the foregoing, copolymers of the foregoing, crosslinked and network structures of the foregoing, and blends of the foregoing; to which is added an appropriate ionic electrolyte salt. The solid polymer electrolytes of this invention may optionally further comprise one or more electrolyte solvents, typically less than 20% by weight.

To improve the ionic conductivity and other electrochemical properties of the electrolyte element, the organic electrolyte typically comprises one or more ionic electrolyte salts. As used herein, liquid electrolytes, gel polymer electrolytes, and solid polymer electrolytes comprise an ionic electrolyte salt.

Examples of ionic electrolyte salts for use in the present invention include, but are not limited to, MBr, MI, $MClO_4$, $MAsF_6$, MSCN, $MSO_3CF_3$, $MSO_3CH_3$, $MBF_4$, $MB(Ph)_4$, $MPF_6$, $MC(SO_2CF_3)_3$, $MN(SO_2CF_3)_2$,

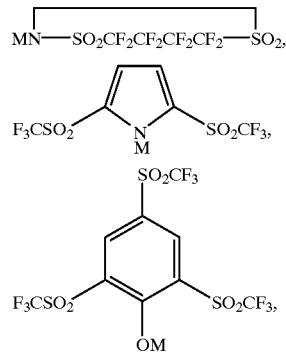

and the like, where M is Li or Na. Other electrolyte salts useful in the practice of this invention are lithium polysulfides, lithium salts of organic ionic polysulfides and those disclosed in U.S. Pat. No. 5,538,812 to Lee et al. Preferred ionic electrolyte salts are LiI, LiSCN, $LiSO_3CF_3$ (lithium triflate) and $LiN(SO_2CF_3)_2$ (lithium imide).

Since the microporous pseudo-boehmite layer of this invention is usually impermeable to high molecular weight materials such as the polymers typically used in gel polymer electrolytes and solid polymer electrolytes, it is preferable to introduce the polymer component of the electrolyte in a low molecular weight monomer or macromonomer form into pores of the pseudo-boehmite layer. Subsequently, the low molecular weight monomer or macromonomer may be cured into a polymer to provide the desired type of solid polymer or gel polymer electrolyte. Suitable monomers or macromonomers include, but are not limited to, heat- or radiation-curable monomers or macromonomers. Examples include, but are not limited to, divinyl ethers such as tetraethyleneglycol divinyl ether. To provide sensitivity to ultraviolet (UV) or visible radiation where the monomers or macromonomers do not absorb significantly, a conventional photosensitizer may be added to cause curing of the monomers or macromonomers into a polymeric material. For example, a small amount, such as 0.2% by weight of the monomers or macromonomers, of a UV sensitizer may be added.

A particular advantage of the ultrafine pores and strong capillary action of the pseudo-boehmite layer of the separator of the present invention is its excellent wetting by a broad variety of electrolytes and retention of these electrolytes in the pores. Accordingly, it is possible to incorporate liquid or tacky electrolyte materials into the nanoporous matrix of the pseudo-boehmite layer without having a significant excess of liquid or tacky material on the surface of the separator. In one embodiment, the electrolyte material is held below the outermost surface of the protective coated pseudo-boehmite separator during the cell fabrication process. For example, this is useful in preventing the tacky surfaces of polymer electrolytes from interfering with the fabrication processes of winding or layering a multiple layer construction of an electric current producing cell. For liquid organic electrolytes, no polymer is required, and the electrolyte composition may consist of only electrolyte solvents and ionic electrolyte salts Electric Current Producing Cells and Methods of Preparing Same The present invention provides an electric current producing cell comprising a cathode and an anode and an electrolyte element interposed between the cathode and the anode, wherein the electrolyte element comprises (a) a separator comprising (i) at least one microporous pseudo-boehmite layer in contact with (ii) at least one protective coating layer, and (b) an electrolyte, preferably an organic electrolyte, contained within pores of the separator, as described herein for the separator and the electrolyte element, and for the methods of making the separator and electrolyte element of the present invention. The pseudo-boehmite layer of the separator typically has a pore volume from 0.02 to 2.0 cm$^3$/g, before the introduction of the electrolyte, and has an average pore diameter from 1 nm to 300 nm, as described herein for the microporous pseudo-boehmite layer of the separator.

Although the electric current producing cell of the present invention may be utilized for a wide variety of primary and secondary batteries known in the art, it is preferred to utilize these cells in secondary or rechargeable batteries where the many features of a free standing or directly coated microporous pseudo-boehmite separator may be employed to help control the chemistry of the active materials through many repeated discharge and charge cycles. Preferably, the batteries are of a prismatic configuration.

A wide variety of anode active materials may be utilized in the anodes for electric current producing cells of the present invention. Suitable anode active materials for the electric current producing cells of the present invention include, but are not limited to, one or more metals or metal alloys or a mixture of one or more metals and one or more alloys, wherein said metals are selected from the Group IA and IIA metals in the Periodic Table. Examples of suitable anode active materials of the present invention include, but are not limited to, alkali-metal intercalated conductive polymers, such as lithium doped polyacetylenes, polyphenylenes, polypyrroles, and the like, and alkali-metal intercalated graphites and carbons. Anode active materials comprising lithium are especially useful. Preferred anode active materials are lithium metal, lithium-aluminum alloys, lithium-tin alloys, lithium-intercalated carbons, and lithium-intercalated graphites.

A wide variety of cathode active materials may be utilized in the cathodes for the electric producing cells of the present invention. Suitable cathodes for the cells of this invention include, but are not limited to, cathodes comprising cathode active materials selected from the group consisting of: electroactive transition metal chalcogenides, electroactive conductive polymers, and electroactive sulfur-containing materials. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. Preferred transition metal chalcogenides are electroactive oxides of cobalt, manganese and vanadium. In one embodiment, the cathode of the cell of this invention comprises an electroactive conductive polymer. Examples of suitable conductive polymers include, but are not limited to, electroactive and electronically conductive polymers selected from the group consisting of polypyrroles, polyphenylenes, polythiophenes, and polyacetylenes. Preferred conductive polymers are polypyrroles and polyacetylenes.

Preferred cathode active materials are those comprising electroactive sulfur-containing materials. The term "electroactive sulfur-containing material," as used herein, relates to cathode active materials which comprise the element sulfur in any form, wherein the electrochemical activity involves the breaking or forming of sulfur-sulfur covalent bonds. The nature of the electroactive sulfur-containing materials useful in the cathodes of the cells of this invention may vary widely. The electroactive properties of elemental sulfur and of other sulfur-containing materials are well known in the art, and typically include the reversible formation of lithiated or lithium ion sulfides during the discharge or cathode reduction cycle of the battery.

In one embodiment, the electroactive sulfur-containing material comprises elemental sulfur.

In one embodiment, the electroactive sulfur-containing material is organic, that is, it comprises both sulfur atoms and carbon atoms.

In one embodiment, the electroactive sulfur-containing material is polymeric. In one embodiment, the sulfur-containing material comprises a sulfur-containing polymer comprising a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 8. In one embodiment, the polysulfide moiety, $S_m$, is covalently bonded by one or both of its terminal sulfur atoms on a side group to the polymer backbone chain of the sulfur-containing polymer. In one embodiment, the polysulfide moiety, $S_m$, comprises a covalent —$S_m$— moiety, which covalent —$S_m$— moiety is incorporated by covalent bonds to both of its terminal sulfur atoms into the polymer backbone chain of the sulfur-containing polymer.

Examples of electroactive sulfur-containing polymers include, but are not limited to, those comprising one or more carbon-sulfur polymers of general formulae $(CS_x)_n$ and $(C_2S_z)_n$. Compositions comprising the general formula —$(CS_x)_n$—, wherein x ranges from 1.2 to 2.3, and n is an integer equal to or greater than 2, are described in U.S. Pat. No. 5,441,831 to Okamoto et al. Additional examples include those wherein x ranges from greater than 2.3 to about 50, and n is equal to or greater than 2, as described in U.S. Pat. Nos. 5,601,947 and 5,690,702 to Skotheim et al. Additional examples of electroactive sulfur-containing polymers include those compositions comprising the general formula —$(C_2S_z)_n$—, wherein z ranges from greater than 1 to about 100, and n is equal to or greater than 2, as described in U.S. Pat. No. 5,529,860 and copending U.S. patent application Ser. No. 08/602,323 to Skotheim et al. of the common assignee.

The preferred materials of general formulae $(CS_x)_n$ and $(C_2S_2)_n$, in their oxidized state, comprise a polysulfide moiety of the formula, —$S_m$—, wherein m is an integer equal to or greater than 3, or more preferably, wherein m is an integer from 3 to 10. In one embodiment, m is an integer from 3 to 6. In one embodiment, m is an integer from 3 to 8. In one embodiment, m is an integer from 6 to 10. In one embodiment, m is an integer from 8 to 10. In one embodiment, the polysulfide linkage comprises —S—S—S— (i.e., trisulfide). In one embodiment, the polysulfide linkage comprises —S—S—S—S— (i.e., tetrasulfide). In one embodiment, the polysulfide linkage comprises —S—S—S—S—S— (i.e., pentasulfide). In one embodiment, the polysulfide linkage comprises —S—S—S—S—S—S— (i.e., hexasulfide). In one embodiment, the polysulfide linkage comprises —S—S—S—S—S—S—S— (i.e., heptasulfide). In one embodiment, the polysulfide linkage comprises —S—S—S—S—S—S—S—S— (i.e., octasulfide).

The backbone of electroactive sulfur-containing polymers may comprise polysulfide —$S_m$— main chain linkages as well as covalently bound —$S_m$— side groups. Owing to the presence of multiple linked sulfur atoms, —$S_m$—, where m is an integer equal to or greater than 3, in these materials, they possess significantly higher energy densities than corresponding materials containing the disulfide linkage, —S—S—, alone.

Other preferred electroactive sulfur-containing polymers are those comprising carbocyclic repeat groups, as described in copending U.S. patent application Ser. No. 08/995,112, to Gorkovenko et al. of the common assignee.

Other examples of electroactive sulfur-containing polymers comprising a polysulfide moiety, $S_m$, where m is an integer that is equal to or greater than 3, are those containing electron conducting polymers and at least one polysulfurated chain forming a complex with the polymer, as described in U.S. Pat. No. 4,664,991 to Perichaud et al.

Other examples of electroactive sulfur-containing polymers include organo-sulfur materials comprising disulfide linkages, although their low specific capacity compared to the corresponding materials containing polysulfide linkages makes it highly difficult to achieve the desired high capacities in electric current producing cells. However, they may also be utilized in a blend in the cathode active layer with elemental sulfur and/or with sulfur-containing polymers comprising a polysulfide moiety in the solid composite cathodes of this invention and contribute by their electrochemical properties, their known interaction with lithium polysulfides and lithium sulfides generated during the cycling of the cells, and, optionally, their melting properties, to achieving the desired high capacities in the electric current producing cells of the present invention. Examples of these electroactive sulfur-containing materials comprising disulfide groups include those described in U.S. Pat. No. 4,739,018 to Armand et al.; U.S. Pat. Nos. 4,833,048 and 4,917,974, both to DeJonghe et al.; U.S. Pat. Nos. 5,162,175 and 5,516,598, both to Visco et al.; and U.S. Pat. No. 5,324,599 to Oyama et al.

Other suitable examples of electroactive sulfur-containing materials include materials of general formula, $C_vS$, wherein v is a numerical value within the range of about 4 to about 50, as described in U.S. Pat. No. 4,143,214 to Chang et al. Other examples of electroactive sulfur-containing polymers are those which contain one or more polymer compounds having a plurality of carbon monosulfide units that may generally be written as $(CS)_w$, wherein w is an integer of at least 5, as described in U.S. Pat. No. 4,152,491 to Chang et al.

Electroactive sulfur-containing polymers for the solid composite cathodes of the present invention typically have elemental compositions containing between about 50 weight percent and 98 weight percent sulfur. In one embodiment, the sulfur-containing polymer comprises greater than 75 weight percent of sulfur, and, preferably, greater than 86 weight percent of sulfur, and, most preferably, greater than 90 weight percent of sulfur.

In another embodiment of the electric current producing cell of the present invention, the electrolyte of the electrolyte element is an organic electrolyte comprising one or more electrolytes selected from the group consisting of: liquid electrolytes, gel polymer electrolytes and solid polymer electrolytes.

A method for forming the electric current producing cell of the present invention comprises providing an anode and a cathode and interposing an electrolyte element of the present invention, as described herein, between the anode and the cathode.

In one embodiment of the methods of forming the electric current producing cell, the electrolyte of the electrolyte element is an organic electrolyte comprising one or more electrolytes selected from the group consisting of: liquid electrolytes, gel polymer electrolytes, and solid polymer electrolytes.

The flexibility of the product designs and methods of forming the separators and electrolyte elements of the present invention provides the option of effectively incorporating electrolyte or the ionic electrolyte salt of the electrolyte into the electric current producing cell at a later or final stage of fabricating materials into the cell. This may be advantageous when the ionic electrolyte salt is hygroscopic and difficult to coat as part of an electrolyte element and then difficult to keep from absorbing water before fabrication and hermetic sealing of the cell in a dry room facility. This may also be advantageous when the ionic electrolyte salt increases the viscosity and otherwise interferes with the wetting and penetration of a liquid or polymer electrolyte into the separator and cathode layers during the filling of the cell. In a preferred embodiment, the electrolyte is contacted with the separator layer of the electrolyte element after the processes of winding or layering a multiple layer construction of an electric current producing cell. For example, after the separator is enclosed between the anode and the cathode, there is a subsequent step comprising the imbibition of the electrolyte, for example, a solution comprising one or more ionic electrolyte salts and one or more electrolyte solvents, into the electrolyte element. In these multilayer cell stacks, the excellent wetting and strong capillary action of the separators of this invention are advantageous in promoting the imbibition and filling of the pores of the separator by the electrolyte, preferably a liquid organic electrolyte. In a most preferred embodiment, the electrolyte element that is enclosed between the anode and the cathode initially contains no ionic electrolyte salt, and the ionic electrolyte salts required for the electrolyte element are provided by a subsequent step of imbibing a highly concentrated solution comprising one or more ionic electrolyte salts and one or more electrolyte solvents. To achieve the desired final concentration of ionic electrolyte salts in the organic electrolyte, the concentration of ionic electrolyte salts in the imbibed highly concentrated solution will be correspondingly much greater than this desired final concentration.

EXAMPLES

Several embodiments of the present invention are described in the following examples, which are offered by way of illustration and not by way of limitation.

Comparative Example 1

A cathode was prepared by coating a mixture of 75 parts of elemental sulfur (available from Aldrich Chemical Company, Milwaukee, Wis.), 20 parts of a conductive carbon pigment PRINTEX XE-2 (a trademark for a carbon pigment available from Degussa Corporation, Akron, Ohio), and 5 parts of PYROGRAF-III (a tradename for carbon filaments available from Applied Sciences, Inc., Cedarville, Ohio) dispersed in isopropanol onto a 17 micron thick conductive carbon coated aluminum foil substrate (Product No. 60303 available from Rexam Graphics, South Hadley, Mass.). After drying and calendering, the coated cathode active layer thickness was about 12 microns. The anode was lithium foil of about 50 microns in thickness. The electrolyte was a 0.75 M solution of lithium bis(trifluoromethyl) sulfonimide, (lithium imide available from 3M Corporation, St. Paul, Minn.) in a 50:50 volume ratio mixture of 1,3-dioxolane and dimethoxyethane. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.).

The above components were combined into a layered structure of cathode/separator/anode, which was wound and compressed, with the liquid electrolyte filling the void areas of the separator and cathode to form prismatic cells with an electrode area of about 100 $cm^2$. Discharge-charge cycling on these cells was done at 0.5/0.3 $mA/cm^2$, respectively, with discharge cutoff at a voltage of 1.3V and charge cutoff at 3V or 5 hour charge, whichever came first. Typical capacity of these cells was 90 mAh (specific capacity of 728 mAh/g of elemental sulfur in the cell) at the $5^{th}$ cycle with a total capacity fade of about 22% over the next 15 cycles.

Comparative Example 2

A microporous layer of pseudo-boehmite with binder present was prepared according to the following procedure. A coating mixture comprising 86 parts by weight (solid content) of DISPAL 11N7-12 (a trademark for boehmite sol available from CONDEA Vista Company, Houston, Tex.), 6 parts by weight (solid content) of AIRVOL 125 (a trademark for polyvinyl alcohol polymer available from Air Products, Inc., Allentown, Pa.), 3 parts by weight of polyethylene oxide (900,000 MW from Aldrich Chemical Company, Milwaukee, Wis.) and 5 parts by weight polyethylene oxide dimethylether, M-250, (Fluka Chemical Company, Ronkonkoma, N.Y.) in water was prepared. This coating mixture was coated directly on the cathode active layer from Comparative Example 1, using a gap coater so that the dry pseudo-boehmite coating thickness would be about 12 microns and followed by drying at 130° C. Prismatic cells were constructed as in Comparative Example 1 except that the cathode and polyolefin separator were replaced by this pseudo-boehmite coated cathode. Discharge-charge cycling was performed on these cells at the same current density as in Comparative Example 1. Capacity of these cells was 60 mAh (specific capacity of 584 mAh/g of elemental sulfur in the cell) at the $5^{th}$ cycle with a total capacity fade of about 8% over the next 15 cycles. Fabrication of these prismatic cells was difficult because of the fragility of the pseudo-boehmite coating layer.

Example 1

A 5% by weight solution of a 3:2 ratio by weight of CD 9038 (a tradename for ethoxylated bisphenol A diacrylate, available from Sartomer Inc., Exton, Pa.) and CN 984 (a tradename for a urethane acrylate available from Sartomer Inc., Exton, Pa.) was prepared by dissolving these macromonomers in ethyl acetate. To this solution, 0.2% by weight (based on the total weight of acrylates) of ESCURE KTO (a tradename for a photosensitizer available from Sartomer Inc., Exton, Pa.) was added. This solution was coated onto the pseudo-boehmite coated cathode of Comparative Example 2 and dried to remove the solvent present and to form the protective coating layer. The coating thickness of the dried protective coating layer comprising a polymer in the form of macromonomers on top of the microporous pseudo-boehmite layer was 4 microns. The dried film was then cured by placing it on the conveyor belt of a FUSION Model P300 UV exposure unit (available from Fusion Systems Company, Torrance, Calif.) and exposing it to the UV lamps for 30 seconds to form a cured protective coating layer comprising a polymer. Prismatic cells were constructed as in Comparative Example 2 except that the pseudo-boehmite coated cathode was replaced by this protective coated pseudo-boehmite coated cathode. Discharge-charge cycling was performed on these cells at the same current density as in Comparative Example 1. Capacity of these cells was 60 mAh (specific capacity of 541 mAh/g of elemental sulfur in the cell) at the $5^{th}$ cycle with a total capacity fade of about 14% over the next 7 cycles. The flexibility and durability of the separator during the fabrication of the prismatic cells was significantly improved by the protective coating layer, and the cycling behavior of these cells was not significantly affected.

Example 2

Prismatic cells were prepared as in Example 1 except that the protective coating solution contained, in addition to the macromonomers of Example 1, 5% by weight of CAB-O-SIL TS-530 (a trademark for a fumed silica pigment available from Cabot Corporation, Tuscola, Ill.) which was dispersed in the solution by sonication. The thickness of the pigmented protective coating layer was about 4 microns. Discharge-charge cycling was performed on these cells at the same current density as in Comparative Example 1. Typical capacity of these cells was 80 mAh (specific capacity of 708 mAh/g of elemental sulfur in the cell) at the $5^{th}$ cycle with a total capacity fade of about 25% over the next 15 cycles. The flexibility of the separator was improved by this top coating, and the capacity of these cells was also improved. Fabrication of these prismatic cells was significantly improved over the prismatic cells comprising only a pseudo-boehmite coating layer of Comparative Example 2.

Example 3

Prismatic cells were constructed as in Example 2 except that the cathode area was enlarged to 347 $cm^2$ and the electrolyte was a 1.4 M solution of lithium imide in a 30:40 ratio by volume mixture of 1,3-dioxolane and dimethoxyethane. Discharge-charge cycling was performed on these cells at the same current density as in Comparative Example 1. Typical specific capacity of the cells was 729 mAh/g of elemental sulfur in the cell at the $3^{rd}$ cycle with a total capacity fade of 3% over the next 20 cycles. The flexibility and toughness of the protective coated separator permitted the fabrication of the larger cells. Attempts to construct prismatic cells of 347 $cm^2$ according to Comparative Example 2 were completely unsuccessful, due to the fragility of the pseudo-boehmite layer without a protective coating.

Comparative Example 3

Prismatic cells were constructed as in Comparative Example 1 except that the cathode area was enlarged to 347 $cm^2$, and the electrolyte was that used in Example 3. Discharge-charge cycling was performed on these cells at the same current density as in Comparative Example 1.

Typical specific capacity of the cells was 963 mAh/g of elemental sulfur in the cell at the $3^{rd}$ cycle with a total capacity fade of 14% over the next 20 cycles.

Example 4

Prismatic cells were constructed as in Example 3 except that the cathode area of each cell was 500 cm$^2$. Discharge-charge cycling was performed on these cells at the same current density as in Comparative Example 1. The specific capacity of the cells were 850 mAh/g of elemental sulfur in the cell at the $5^{th}$ cycle with a total capacity fade of 17% over the next 80 cycles. After 100 cycles, the average capacity of these cells was 77% of the specific capacity at the $5^{th}$ cycle.

Comparative Example 4

Prismatic cells were constructed as in Comparative Example 3 except that the cathode area was 500 cm$^2$. Discharge-charge cycling was performed on these cells at the same current density as in Comparative Example 1. The specific capacity of the cells were 812 mAh/g of elemental sulfur in the cell at the $5^{th}$ cycle with a total capacity fade of 13% over the next 80 cycles.

Example 5

Prismatic cells were constructed as in Example 2 except that the cathode area was enlarged to 1000 cm$^2$. Discharge-charge cycling was performed on these cells at the same current density as in Comparative Example 1. Typical capacity of the cells was 836 mAh (specific capacity of the cells was 669 mAh/g of elemental sulfur in the cell) at the $5^{th}$ cycle, and at the $201^{st}$ cycle, the total capacity was 62% of the capacity at the $5^{th}$ cycle.

Example 6

Prismatic cells were prepared as in Example 2, except that the cathode area was enlarged to 800 cm$^2$, and after the protective coating layer comprising a polymer was cured, a second pseudo-boehmite layer of 6 micron thickness was coated on top to form a separator comprising three layers: a first pseudo-boehmite layer, an intermediate protective coating layer, and a second pseudo-boehmite layer. The electrolyte was a 1.4 M solution of lithium imide in a 30:40 by volume mixture of 1,3-dioxolane and dimethoxyethane. Discharge-charge on this cell was performed at the current density of 0.44/0.25 mA/cm$^2$, respectively. Typical capacity of this cell was 911 mAh at the $5^{th}$ cycle with a capacity fading of about 0.9% over the next 30 cycles.

Example 7

A 3% solution of poly(butyl methacrylate), M.W. 337,000, (available from Aldrich Chemical Company, Milwaukee, Wis.) was prepared in ethyl acetate. The cathode active layer of Comparative Example 1 was coated with the poly (butyl methacrylate) solution to yield a protective coating layer of about 1 micron thickness after drying. Upon this protective coating layer was coated a pseudo-boehmite layer of about 12 micron thickness, as described in Comparative Example 2. After drying the pseudo-boehmite layer, a third layer protective polymer coating layer, as described in Example 2, was coated on top of the pseudo-boehmite layer with a coating layer thickness of about 4 micron. This separator coated on top of the cathode active layer comprised three layers: (1) a first protective coating layer, (2) an intermediate pseudo-boehmite layer, and (3) a second protective coating layer.

Vial cells were constructed as in Comparative Example 2. Discharge-charge cycling on these cells was performed at the same current density as in Comparative Example 1. Typical specific capacity of these cells was 600 to 670 mAh/g of elemental sulfur in the cell at the $5^{th}$ cycle and 635 to 700 mAh/g of elemental sulfur in the cell at the $50^{th}$ cycle. The fading rate of capacity calculated from the $5^{th}$ cycle was about 0.5% per cycle over the next 100 cycles.

Example 8

The cathode active layer of Comparative Example 1 was coated with a pseudo-boehmite separator layer of about 6 micron thickness, as in Comparative Example 2. This separator layer was coated with the poly (butyl methacrylate) solution of Example 7 to yield a coating of about 4 micron thickness after drying. Upon this coating was next coated a second pseudo-boehmite layer of about 6 micron thickness. This separator coated on the cathode comprised three layers: (1) a first pseudo-boehmite layer, (2) an intermediate protective coating layer comprising a polymer layer, and (3) a second pseudo-boehmite layer.

Vial cells were constructed as in Example 7 and discharge-charge cycling of these cells was performed at the same current density as in Comparative Example 1. Typical specific capacity of these cells was 680 to 715 mAh/g of elemental sulfur in the cell at the $5^{th}$ cycle, and 650 to 720 mAh/g of elemental sulfur in the cell at the $50^{th}$ cycle. The fading rate of capacity calculated from the $5^{th}$ cycle was about 0.2% per cycle over the next 100 cycles.

Comparative Example 5

A cathode was prepared by coating a mixture of 65 parts of elemental sulfur, 15 parts of a conductive carbon pigment PRINTEX XE-2, 15 parts of a graphite pigment (available from Fluka Chemical Company, Ronkonkoma, N.Y.), and 5 parts of fumed silica CAB-O-SIL. EH-5 (a tradename for silica pigment available from Cabot Corporation, Tuscola, Ill.) dispersed in isopropanol onto a 17 micron thick conductive carbon coated aluminum coated PET substrate (available from Rexam Graphics, South Hadley, Mass.). After drying and calendering, the coated cathode active layer thickness was about 15–18 microns. The anode was lithium foil of about 50 microns in thickness. The electrolyte was a 1.4 M solution of lithium bis(trifluoromethyl)sulfonimide in a 30:40 volume ratio mixture of 1,3-dioxolane and dimethoxyethane. The porous polyolefin separator used was 16 micron E25 SETELA.

The above components were combined into a layered structure of cathode/separator/anode, which was wound and compressed, with the liquid electrolyte filling the void areas of the separator and cathode to form prismatic cells with an electrode area of about 800 cm$^2$. Discharge-charge cycling on these cells was done at 0.44/0.31 mA/cm$^2$, respectively, with discharge cutoff at a voltage of 1.5V and charge cutoff at 2.8V or 120% overcharge, whichever came first. Typical capacity of these cells was 700–800 mAh (specific capacity of 800–900 mAh/g of elemental sulfur in the cell) at the $5^{th}$ cycle with a total capacity fade of about 2.5% over the next 15 cycles.

Example 9

The cathode active layer of Comparative Example 5 was coated with a 15% by weight solution of a 1:1 mixture of Hycar 1571 and Hycar 1578x1 (tradenames for acrylonitrile-butadiene and acrylonitrile-butadiene-styrene latex emulsions, respectively, available from B.F. Goodrich Specialty Chemicals, Cleveland, Ohio) to yield a first protective coating layer of about 2 micron thickness after drying. Upon this protective coating layer was coated a pseudo-boehmite layer of about 10 micron thickness, as described in Comparative Example 2. After drying the pseudo-boehmite layer, a third layer, a second protective polymer coating layer, as described in Example 2, was coated on top of the pseudo-boehmite layer with a coating layer thickness of about 3 microns. The separator coated on top of the cathode active layer thus comprised three layers: (1) a first protective coating layer, (2) an intermediate pseudo-boehmite layer, and (3) a second protective coating layer.

Prismatic cells were constructed as in Comparative Example 5, except that the cathode and polyolefin separator were replaced by this separator coated cathode. Discharge-charge cycling on these cells was performed at the same current density as in Comparative Example 5. Typical specific capacity of these cells was approximately 670 mAh/g of elemental sulfur in the cell at the $10^{th}$ cycle. The total capacity fade over the next 15 cycles was 7.7%.

Example 10

The pseudo-boehmite coated cathode of Comparative Example 2 was coated with a 15%, by weight, solution of a 1:1 mixture of Hycar 1571 and Hycar 1578×1 to form a first protective coating layer of about 2 micron thickness after drying to remove the solvent present. The polymer solution of Example 1 was coated on this latex polymer coated pseudo-boehmite layer and dried. The coating thickness of the second dried protective coating layer comprising a polymer in the form of macromonomers on top of the microporous pseudo-boehmite layer was 4 microns. The dried film was then cured using UV lamps as described in Example 1 to form a cured second protective coating layer comprising a polymer. This separator coated on top of the cathode active layer comprised three layers: (1) a pseudo-boehmite layer, (2) a first protective coating layer, and (3) a second protective coating layer.

Prismatic cells were constructed as in Comparative Example 2 except that the pseudo-boehmite coated cathode was replaced by this protective coated pseudo-boehmite coated cathode. Discharge-charge cycling was performed on these cells at the same current density as in Comparative Example 5. Typical specific capacity of these cells was approximately 550 mAh/g of elemental sulfur in the cell at the $5^{th}$ cycle.

Example 11

The pseudo-boehmite coated cathode of Comparative Example 2 was coated with a 15%, by weight, solution of a 1:1 mixture of Hycar 1571 and Hycar 1578×1 to form a first protective coating layer of about 2 micron thickness after drying to remove the solvent present. Upon this coating was coated a second pseudo-boehmite layer of approximately 6 micron thickness. The polymer solution of Example 1 was coated on this second pseudo-boehmite layer, dried and cured. The coating thickness of the second dried protective coating layer comprising a polymer in the form of macromonomers on top of the microporous pseudo-boehmite layer was 4 microns. This separator coated on top of the cathode active layer comprised four layers: (1) a first pseudo-boehmite layer, (2) a first protective coating layer, (3) a second pseudo-boehmite layer, and (4) a second protective coating layer.

Prismatic cells were constructed as in Comparative Example 2 except that the pseudo-boehmite coated cathode was replaced by this protective coated pseudo-boehmite coated cathode. Discharge-charge cycling was performed on these cells at the same current density as in Comparative Example 5. Typical specific capacity of these cells was approximately 620 mAh/g of elemental sulfur in the cell at the $5^{th}$ cycle.

While the invention has been described in detail and with reference to specific and general embodiments thereof, it will be apparent to one skilled in the art that various changes and modifications can be made therein without departing from the spirit and scope thereof.

What is claimed is:

1. An electrolyte element for use in an electric current producing cell, wherein said electric current producing cell comprises a cathode having a cathode active layer, an anode, and said electrolyte element interposed between said cathode and said anode, wherein said electrolyte element comprises a separators an electrolyte, and one or more protective coating layers; and said separator comprises one or more microporous pseudo-boehmite layers; and wherein at least one of said one or more protective coating layers is on the anode-facing side of said electrolyte element on the side opposite from said cathode and is interposed between said anode and said separator.

2. The electrolyte element of claim 1, wherein at least one of said one or more protective coating layers on said anode-facing side of said electrolyte element comprises a polymer.

3. The electrolyte element of claim 2, wherein at least one of said one or more protective coating layers comprising a polymer is a single ion conducting layer.

4. The electrolyte element of claim 2, wherein said polymer comprises a conductive polymer selected from the group consisting of poly(p-phenylene), polyacetylene, poly (phenylenevinylene), polyazulene, poly(perinaphthalene), polyacenes, and poly(naphthalene-2,6-diyl).

5. The electrolyte element of claim 2, wherein said protective coating layer comprising a polymer has a thickness of from 0.2 to 20 microns.

6. The electrolyte element of claim 2, wherein said protective coating layer comprising a polymer has a thickness of from 0.5 to 5 microns.

7. The electrolyte element of claim 2, wherein said polymer comprises one or more moieties formed by the polymerization of one or more monomers or macromonomers selected from the group consisting of monomers or macromonomers having the formula:

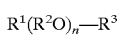

wherein:
R$^1$ is the same or different at each occurrence and is selected from the group consisting of
CH$_2$=CH(C=O)—O—,
CH$_2$=C(CH$_3$)(C=O)O—,
CH$_2$=CH—,

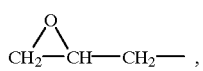

CH$_2$=CH—O—;
R$^2$ is the same or different at each occurrence and is selected from the group consisting of
—CH$_2$—CH$_2$—,
—CH(CH$_3$)—CH$_2$—,
—CH$_2$—CH$_2$—CH$_2$—,

—CH($C_2H_5$)—$CH_2$—,
—$CH_2$—$CH_2$—$CH_2$—$CH_2$—;

$R^3$ is the same or different at each occurrence and is selected from the group consisting of cyano, methyl, ethyl, propyl, isopropyl, butyl, isobutyl, hexyl, 2-ethylhexyl, decyl, dodecyl, phenyl, butylphenyl, octylphenyl, nonylphenyl, $R^1$, —X—$(OR^2)_m$—$R^1$, —Y$[(OR^2)_o$—$R^1]_2$, —Z$[(OR^2)_p$—$R^1]_3$;

X is a divalent radical selected from the group consisting of

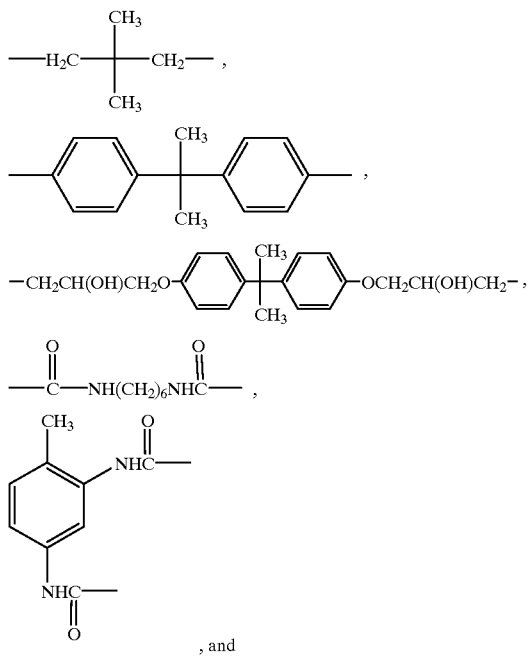

—$(CH_2)_r$—, where r is 3, 4, or 6;

Y is a trivalent radical selected from the group consisting of

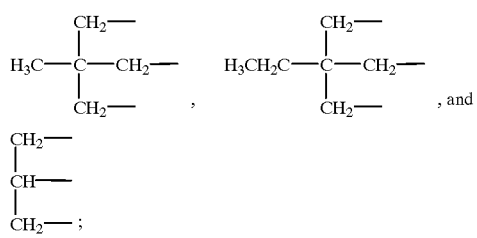

Z is a tetravalent radical selected from the group consisting of

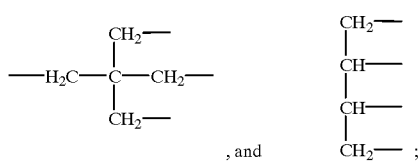

m is an integer ranging from 0 to 100;
n is an integer ranging from 0 to 100;
o is an integer ranging from 0 to 100; and,
p is an integer ranging from 0 to 100.

8. The electrolyte element of claim 2, wherein said polymer comprises one or more moieties formed by polymerization of one or more acrylates selected from the group consisting of polyethylene glycol diacrylates, polypropylene glycol diacrylates, ethoxylated neopentyl glycol diacrylates, ethoxylated bisphenol A diacrylates, ethoxylated aliphatic urethane acrylates, ethoxylated alkylphenol acrylates, and alkyl acrylates.

9. The electrolyte element of claim 2, wherein said polymer comprises a polymer selected from the group consisting of polyacrylates, polymethacrylates, polyolefins, polyurethanes, polyvinyl ethers, polyvinyl pyrrolidones, acrylonitrile-butadiene rubber, styrene-butadiene rubber, acrylonitrile-butadiene-styrene sulfonated styrene/ethylene-butylene/styrene triblock polymers, and mixtures thereof.

10. The electrolyte element of claim 1, wherein at least one of said one or more protective coating layers on said anode-facing side of said electrolyte element is a single ion conductive layer.

11. The electrolyte element of claim 1, wherein at least one of said one or more protective coating layers on said anode-facing side of said electrolyte element comprises a single ion conducting glass conductive to lithium ions.

12. The electrolyte element of claim 11, wherein said single ion conducting glass is selected from the group consisting of lithium silicates, lithium borates, lithium aluminates, lithium phosphates, lithium phosphorus oxynitrides, lithium titanium oxides, lithium lanthanum oxides, lithium silicosulfides, lithium borosulfides, lithium aluminosulfides, lithium germanosulfides, and lithium phosphosulfides, and combinations thereof.

13. The electrolyte element of claim 11, wherein said protective coating layer comprising a single ion conducting glass has a thickness of from 0.005 microns to 5 microns.

14. The electrolyte element of claim 1, wherein at least one of said one or more protective coating layers on said anode-facing side of said electrolyte element comprises a lithium phosphorus oxynitride.

15. The electrolyte element of claim 1, wherein said electrolyte element comprising one or more protective coating layers comprises a first and a second protective coating layer on said anode-facing side of said electrolyte element, wherein said first protective coating layer is in contact with one of said one or more microporous pseudo-boehmite layers of said separator, and said second protective coating layer is in contact with said first protective coating layer on the side opposite from said one of said one or more pseudo-boehmite layers of said separator.

16. The electrolyte element of claim 15, wherein said second protective coating layer comprises a single ion conducting glass conductive to lithium ions.

17. The electrolyte element of claim 16, wherein the combined thickness of said first and second protective coating layers is from 0.01 microns to 20 microns.

18. An electric current producing cell comprising a cathode comprising a cathode active layer, an anode, and an electrolyte element interposed between said cathode and said anode, wherein said electrolyte element comprises;

(a) a separator;
(b) an electrolyte; and
(c) one or more protective coating layers;

wherein said separator comprises one or more microporous pseudo-boehmite layers; and wherein at least one of said one or more protective coating layers is on the anode-facing side of said electrolyte element on the side opposite from said cathode and is interposed between said anode and said separator, and said electrolyte is contained within the pores of said separator.

19. The cell of claim 18, wherein said cell is a secondary electric current producing cell.

20. The cell of claim 18, wherein said cell is a primary electric current producing cell.

21. A method of forming an electric current producing cell, said method comprising the steps of:
   (a) providing an anode;
   (b) providing a cathode; and
   (c) interposing an electrolyte element according to claim 1 between said anode and said cathode, wherein said electrolyte element comprises (i) a separator comprising one or more microporous pseudo-boehmite layers; (ii) an electrolyte within the pores of said separator; and one or more protective layers, and wherein at least one of said one or more protective layers is on the anode-facing side of said separator on the side opposite from said cathode and is interposed between said anode and said separator.

22. The method of claim 21, wherein said electrolyte of said electrolyte element comprises one or more electrolytes selected from the group consisting of liquid electrolytes, gel polymer electrolytes, and solid polymer electrolytes.

23. An electric current producing cell comprising a cathode, an anode, and an electrolyte element interposed between said cathode and said anode, wherein said electrolyte element comprises:
   (a) a separator; and
   (b) an organic electrolyte;

wherein said separator comprises a microporous pseudo-boehmite layer, wherein said separator is in contact with a protective coating layer comprising a polymer; and wherein said organic electrolyte is contained within the pores of said separator.

24. The cell of claim 23, wherein said protective coating layer is on the anode-facing side of said electrolyte element opposite from said cathode.

* * * * *